(12) United States Patent
Ooshima et al.

(10) Patent No.: US 6,439,065 B1
(45) Date of Patent: Aug. 27, 2002

(54) TORQUE DETECTING APPARATUS

(75) Inventors: Syunji Ooshima, Tokyo; Yasuhito Eguchi, Kanagawa; Naomasa Sato, Saitama; Shoji Tanina, Tokyo; Toshiro Hayashi, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/649,887

(22) Filed: Aug. 28, 2000

(30) Foreign Application Priority Data

Aug. 30, 1999 (JP) .......................................... 11-242497

(51) Int. Cl.$^7$ ................................................. G01L 3/02
(52) U.S. Cl. ................................................. 73/862.326
(58) Field of Search ...................... 73/862.191, 862.22, 73/862.28, 862.322, 862.326

(56) References Cited

U.S. PATENT DOCUMENTS

| | | | | |
|---|---|---|---|---|
| 4,874,053 A | * | 10/1989 | Kimura et al. ............. | 180/79.1 |
| 5,234,066 A | * | 8/1993 | Ashing et al. ................ | 180/6.5 |
| 5,508,609 A | * | 4/1996 | Parkinson et al. ...... | 324/207.25 |
| 5,837,909 A | * | 11/1998 | Bill et al. ............... | 73/862.338 |
| 5,841,132 A | * | 11/1998 | Horton et al. .......... | 250/231.13 |

* cited by examiner

*Primary Examiner*—Max Noori
(74) *Attorney, Agent, or Firm*—Frommer Lawrence & Haug LLP; William S. Frommer; Matthew K. Ryan

(57) ABSTRACT

The present invention provides a novel torque detecting apparatus capable of detecting torque with a simple structure and high precision by way of transmitting drive force via a pair of rotary bodies that cause own relative position to be varied by effect of torque to enable detection of variation of resonant frequency corresponding to variation of the relative position under non-contact condition or by way of transmitting drive force via a pair of rotary bodies that cause own relative position to be varied by effect of torque to enable transmission of modulated signal corresponding to variation of the relative position under non-contact condition.

22 Claims, 22 Drawing Sheets

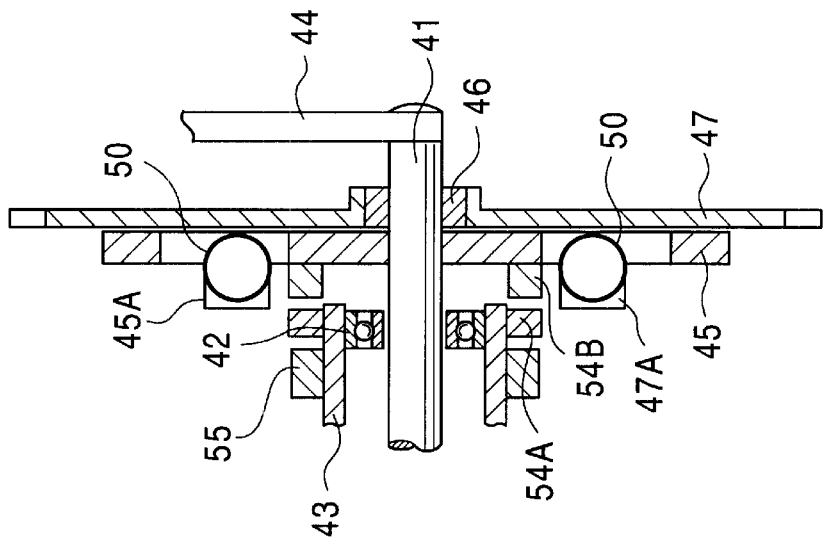
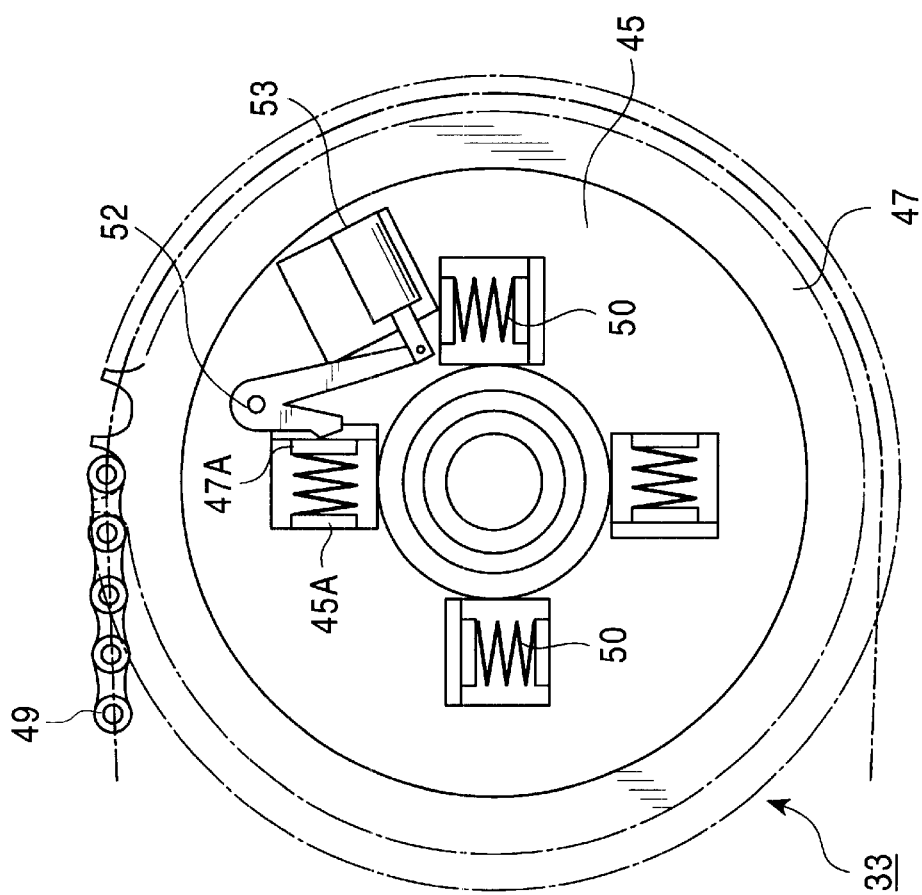

FIG. 7A1 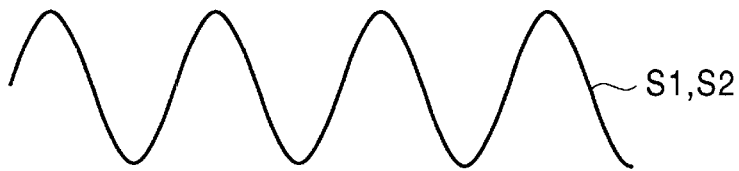 S1,S2
FIG. 7A2 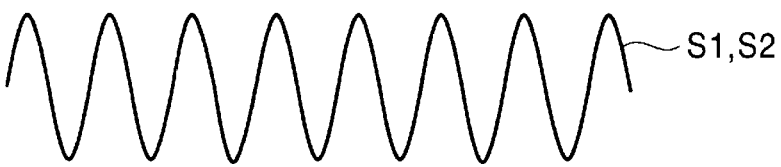 S1,S2
FIG. 7B1  S3
FIG. 7B2  S3
FIG. 7C1  S4
FIG. 7C2  S4
  S5
0-LEVEL

91

TORQUE DETECTING APPARATUS

BACKGROUND OF THE INVENTION

1. Field of the Invention

The present invention relates to a torque detecting apparatus applicable to an electromotive bicycle fitted with a motor as an auxiliary drive source for example. The torque detecting apparatus of the present invention detects torque by way of transmitting drive force via a pair of rotary bodies that cause own relative position to be varied by effect of torque, to enable detection of variation of resonant frequency corresponding to variation of relative position under non-contact condition or to enable transmission of modulated signal corresponding to variation of the relative position under non-contact condition, whereby enabling the apparatus to correctly detect actual torque based on a simple structure with high precision.

2. Description of Related Art

Any of conventional electromotive bicycles has been so arranged that drive of the drive wheel can be assisted by motor-drive force in correspondence with operation of pedals performed by user within such a scope that does not affect operating safety.

Concretely, in such a conventional electromotive bicycle, ratio between pedaling force of user and drive force of the motor is designated by assist ratio. Practically, it is so arranged that the assist ratio can remain at 1:1 within such a range in which the bicycle runs at a relatively slow speed up to 15 km/h. On the other hand, it is so arranged that the assist ratio can gradually be decreased from 1:1 to 1:0 in correspondence with actual speed within a scope from 15 km/h to 25 km/h.

Because of the above arrangement, a variety of torque detecting mechanisms have been provided for conventional electromotive bicycles to detect actual pedaling force generated by users to cause the motor to be driven based on the result of the detected pedaling force.

For example, FIG. 29 is a lateral view showing such a torque detecting mechanism and the torque detecting device 1 which causes a planetary gear 2 to transmit pedaling force to detect actual pedaling force by way of detecting torque counter-force generated on the part of a stationary gear 3.

In specific, as shown in a partially enlarged portion with arrow A, the torque detecting device 1 has such a structure in which the stationary gear 3 having teeth being formed along external circumference is secured to a stationary portion 4. The stationary gear 3 is secured to the stationary portion 4 by effect of a compressed spring 5 disposed between a projected piece 3A projecting itself inside of the stationary gear 3 and another projected piece 4A projecting itself on the part of external circumference of the stationary portion 4.

The planetary gear 2 is rotatably retained by an annular member 6, where the planetary gear 2 is disposed by way of engaging own teeth with the stationary gear 3 across approximately 120 degrees of angular interval on the part of external circumference of the stationary gear 3. In the above-cited torque detecting device 1, a crank is connected to the annular member 6. Motor drive force is transmitted via a further transmission mechanism which is not shown in the drawing.

In the torque detecting device 1, a drive gear 8 is disposed by way of surrounding the planetary gear 2. Teeth formed on the part of internal circumference of the drive gear 8 are disposed via engagement with teeth of the planetary gear 8.

In the torque detecting device 1, the drive gear 8 is rotated by drive force transmitted to the planetary gear 2 via the crank whereby transmitting drive force further to a chain 9 being engaged along external circumference of the drive gear 8.

When drive force is transmitted in this way, by way of resisting pressing force of the compressed spring 5 after being affected by counter force of torque, as shown via arrow B, the stationary gear 3 displaces itself in correspondence with actual magnitude of torque. In response, the torque detecting device 1 causes torque to be converted into displaced amount of the stationary gear 3, where the torque is variable in correspondence with actual pedaling force.

The torque detecting device 1 converts the displaced amount into electrical signal via a variable resistor or the like secured to the stationary portion 4, and then, after processing electrical signal, pedaling force of user can be assisted with motor drive force solely in such a case in which user actually operates pedals with own pedaling force.

FIG. 30 is a plan view showing another example of a conventional torque detecting device 11, in which drive force is sequentially transmitted via a coaxially supported torque converter 13 and a drive-force transmitting rotary body 12. The torque converter 13 transmits drive force to the drive-force-transmitting rotary body 12 via an elastic member such as a spring elongating and contracting itself to subsequently cause relative position of a pair of rotary bodies 12 and 13 to be variable in correspondence with drive force.

In the torque converter 13, it is so arranged that projecting amount of a drive-force transmitting pin 14 can be varied by the variation of the relative position of the above two rotary bodies, and yet, as is designated by reference code C, it is so arranged that a receptive plate 15 rotatably being held by a shaft can be displaced by the drive-force transmitting pin 14. In the torque detecting device 11, it is so arranged that the receptive plate 15 can be energized by a spring 17 secured to a stationary body 16, and yet, by way of expanding displaced amount of the receptive plate 15 by applying a lever 18, the displaced amount is transmitted to another torque detecting device 19. For example, the torque detecting device 19 comprises a variable resistor whose resistance value is variable in correspondence with the displaced amount transmitted via the lever 18. According to the above arrangement, the torque detecting device 11 transmits any variation on the rotary bodies corresponding to actual torque to the stationary members, and then, after properly processing electrical signal transmitted from the variable resistor, the torque detecting device 11 detects drive torque.

FIGS. 31A and 31B are a plan view and a lateral view of a still further example of the conventional torque detecting device. A torque detecting device 21 incorporates a first rotary body 22 and a second rotary body 23 which are respectively disposed via coaxial structure. The first rotary body 22 is rotated by the pedaling force of user, whereas the second rotary body 23 is engaged with a chain 24. The first rotary body 22 and the second rotary body 23 respectively transmit drive force via an elastic member such as a spring to cause relative position to be variable in correspondence with actual pedaling force.

Further, a window 22A and another window 23A are individually provided for the first rotary body 22 and the second rotary body 23 so that they superpose with each other. Whenever the relative positions of the first and second rotary bodies 22 and 23 are shifted, it is so arranged that dimension of aperture formed by the windows 22A and 23A can be varied as well.

A light-emitting unit 26 and a light-receiving unit 27 are secured to the torque detecting device 21 so as to sandwich the aperture. By causing the light-receiving unit 27 to detect measuring light emitted from the light-emitting unit 26, the torque detecting device 21 detects such a torque-detect signal comprising a certain duty ratio being subject to variation in correspondence with actual pedaling force generated by user, as shown in FIG. 32.

Nevertheless, in such a conventional structure using a planetary gear as was described earlier by referring to FIG. 29, it is quite essential that structure in the periphery of the stationary gear be strong enough to withstand pedaling force and drive force, whereby entailing complex structure, and yet, increasing weight. Further, it also entails problem in that operating efficiency remains low, and yet, the structure may require generation of useless force.

On the other hand, in such a system that mechanically detects variation of the relative position of the two rotary bodies as was described earlier by referring to FIG. 30, compared to the case of utilizing a planetary gear, overall structure can be simplified, and yet, generation of noise can be suppressed. Nevertheless, when utilizing this system in order to mechanically transmit the result of pedaling force detected on the movable side, it is essential that the receiving plate 15 be finely fabricated with precision. This in turn entails the complex structure, thus raising problem as well. Further, quality degradation during the service term caused by the wear between the rotary bodies and the stationary body also raises another problem.

On the other hand, in such a system that optically detects variation of the relative position of a pair of rotary bodies as was described above by referring to FIG. 31, it is possible to detect the result of computing pedaling force detected via variation of relative position of the two rotary bodies under non-contact condition, and thus, problems arising from the above-referred two system can be solved. However, when utilizing the optical detection system, torque is intermittently detected, and thus, in order to reduce such a period entailing difficulty to detect torque, it is essential that the number of aperture be increased. Further, in order to improve detecting precision, it is also necessary to enhance precision for forming apertures, whereby causing the processing work to entail complexity to raise another problem.

Aside from the above systems, such a method for detecting pedaling force by way of checking loosened amount of the chain has also been proposed. However, none of the above-referred torque detecting systems has ever been proven to be practically sufficient.

SUMMARY OF THE INVENTION

The present invention has been achieved to fully solve the above problems by way of providing a novel torque detecting apparatus capable of correctly detecting actual torque with a simple structure and high precision.

In order to solve the above problems, the present invention according to claim 1 comprises the following:

displacement detecting means for generating torque modulated signal which is modulated by torque signal corresponding to variation of relative position between a rotary body disposed on the part of drive source being variable in correspondence with torque and another rotary body disposed on the output side; and signal transmitting means for transmitting torque modulated signal from the drive-source-side rotary body to a stationary member or from the output-side rotary body to a stationary member under non-contact condition.

According to the structure according to claim 1, a novel torque detecting apparatus comprises a displacement detecting means for generating torque-modulated signal which is modulated by torque signal corresponding to variation of relative position between a rotary body disposed on the part of drive source being variable in correspondence with torque and another rotary body disposed on the output side and a signal transmitting means for transmitting torque-modulated signal from the drive-source-side rotary body to a stationary member or from the output-side rotary body to a stationary member under non-contact condition. Because of the above arrangement, it is possible for the stationary side to detect torque by way of demodulating the torque-modulated signal under non-contact condition, whereby enabling prevention of precision from incurring degradation otherwise caused by the wear of the components to eventually make it possible to correctly detect actual torque with high precision with a simple structure.

BRIEF DESCRIPTION OF THE DRAWINGS

FIGS. 4A and 4B a plan view and a cross-sectional view of a torque-detecting unit 33 provided for the electromotive bicycle shown in FIG. 2;

FIGS. 7A1 to 7D are waveform charts for explaining the operation of the electromotive bicycle shown in FIG. 2;

DESCRIPTION OF THE PREFERRED EMBODIMENTS

Referring now to the accompanying drawings, practical forms of preferred embodiments of the present invention will be described below.

The First Embodiment

Figure 2:
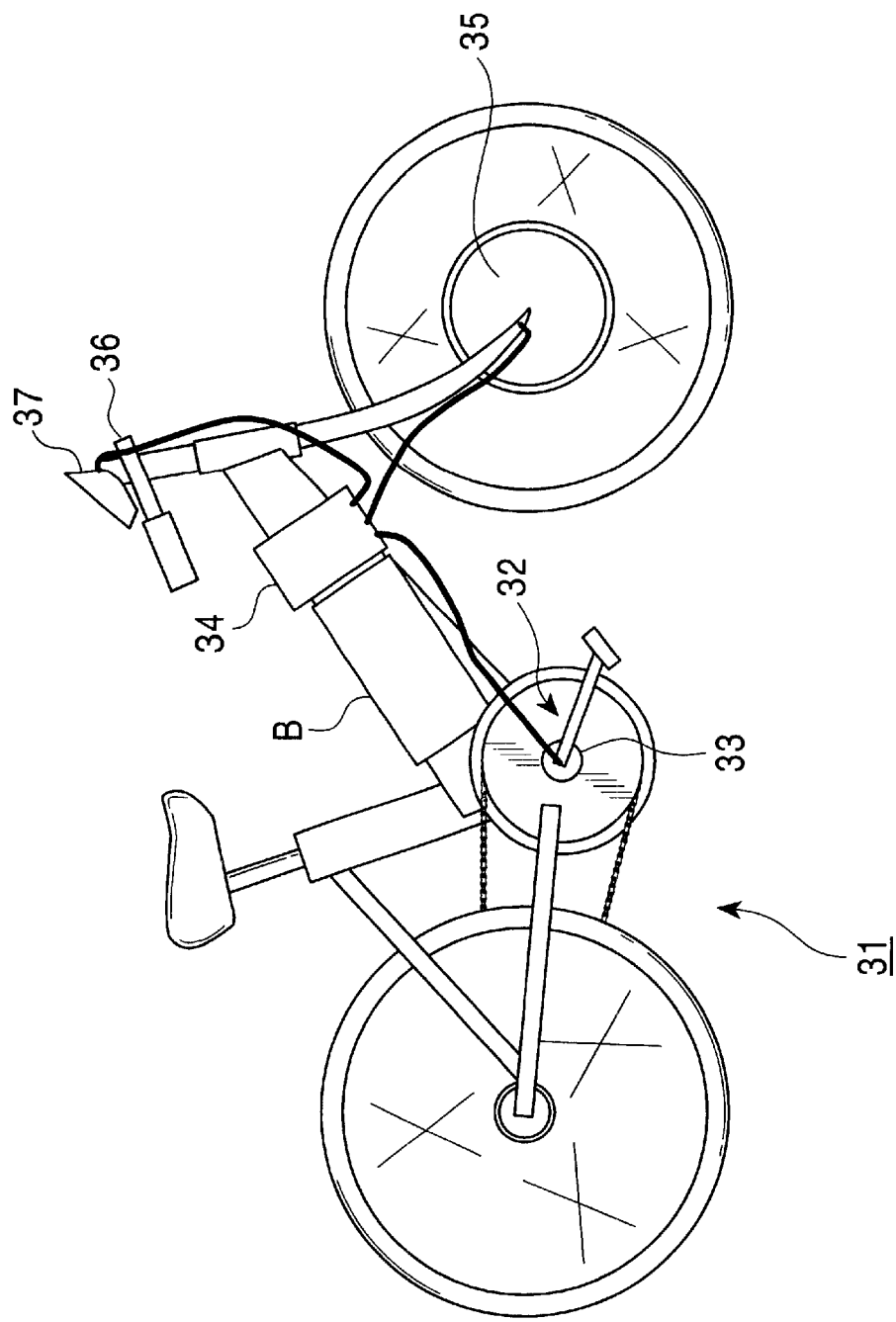
FIG. 2 is a lateral view of the electromotive bicycle according to the first embodiment of the present invention.

FIG. 2 is a lateral view designating an electromotive bicycle according to a first embodiment of the present invention. In an electromotive bicycle 31, a torque detecting unit 33 is secured to a crank-gear unit 32. The torque detecting unit 33 detects actual pedaling force being generated. Based on the detected result, a motor 35 is driven via the control of a motor controller 34 using power fed from a battery pack B.

The electromotive bicycle 31 is based on so-called "front-drive" system which drives a front wheel via the motor 35, whereby simplifying structure in the periphery of the crank-gear unit 32. The motor 35 is of outer-rotor type in which stator and rotor are respectively connected to a front-wheel fork and the front wheel whereby enabling to perform "direct-drive" by way of driving the front wheel so that driving can be performed with minimum loss. The handlebar 36 of the electromotive bicycle 31 is fitted with a display unit 37 to enable the driver to monitor remaining power of the battery pack B. Power can be turned ON by operating a power switch disposed at a location close to the display unit 37.

Figure 3:
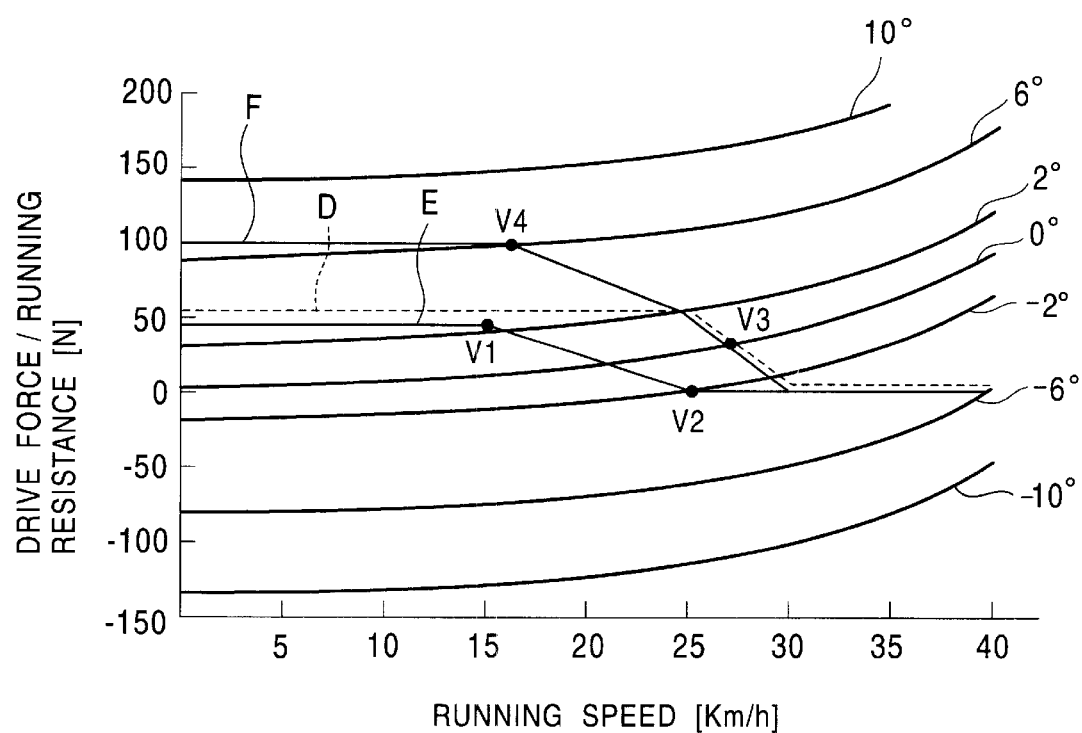
FIG. 3 is a characteristic-curve chart which is explanatory of control operation executed by a motor controller 34 provided for the electromotive bicycle shown in FIG. 2.

FIG. 3 is a characteristic-curve chart denoting running characteristic of the electromotive bicycle. The characteristic curve denotes variation of driving force and running resistance caused by speed in a variety of gradients (shown in terms of angles) when climbing gradients are in the positive direction. In this case, the steeper the gradient, the greater the running resistance, and yet, when the running speed is accelerated, running resistance is also incremental because of wind loss. When the bicycle receives a certain drive force being greater than the running resistance, it accelerates own running speed to run faster. Conversely, when the bicycle receives such a drive force being less than the running resistance, it decelerates own running speed, thus lowering the speed. The bicycle runs at a constant speed in a case in which running resistance coincides with the drive force.

In the above-referred characteristic, as shown via reference code D, it is assumed that drive force generated by user's pedaling operation (this is referred to as man-power drive force in the following description) remains constant until running speed reaches 25 km/h, whereas when the bicycle runs at a speed beyond 25 km/h, drive force decreases relative to the increase of the speed. In this kind of electromotive bicycle, it is so arranged that assist ratio remains at 1:1 or less when the bicycle runs within 0 through 15 km/h of speed range, whereas when the bicycle runs within 15 km/h (V1) through 25 km/h (V2) of speed range, assist ratio gradually decreases from 1:1 to 1:0 in correspondence with actual running speed. Accordingly, in this case, as shown via reference code E, it is necessary to control motor-driven drive force (assisting drive force). In consequence, as shown via reference code F, total drive force comprising man-power drive force and assisting drive force doubles the man-power drive force until the running speed reaches 15 km/h.

Based on the above-specified characteristic, while the bicycle runs on plane, the motor controller 34 accelerates the running speed up to the speed V3 (which corresponds to approximately 27 km/h in FIG. 3) at which characteristic curve at 0 degree of gradient intersects the total drive force. On the other hand, when the bicycle runs on the ground having 6 degrees of gradient, the motor controller 34 accelerates the running speed up to the speed V4 (which corresponds to approximately 16 km/h in FIG. 3) at which characteristic curve at 6 degrees of gradient intersects the total drive force.

While performing the above operation, by referring to the result of torque detection secured by the torque detecting unit 33 and the result of speed detection secured by a speed detecting mechanism not shown, the motor controller 34 properly controls drive force of the motor 35 to surely drive the motor 35 based on the predetermined assist ratio.

FIGS. 4A and 4B jointly represent a plan view and a cross-sectional view showing the torque detecting unit 33 together with peripheral structural components. In the novel electromotive bicycle 31, a crank shaft 41 is rotatably supported by a frame 43 via a bearing 42. A pair of cranks 44 is secured to both ends of the crank shaft 41. In addition, a crank-side disc 45 is secured to the crank shaft 41 to enable the crank-side disc 45 to be rotated by pedaling force.

The electromotive bicycle 31 is further provided with a sprocket gear 47 via a bearing 46 coaxially with the crank-side disc 45 to enable drive force of the crank-side disc 45 to be transmitted to the sprocket gear 47 via a predetermined transmission mechanism. Because of this arrangement, the electromotive bicycle 31 can also drive the rear wheel via a chain 49 engaged with the sprocket gear 47.

The above-referred transmission mechanism comprises projections 45A and 47A which are respectively formed in opposition from the crank-side disc 45 and the sprocket gear 47 and a spring 50 being an elastic member disposed between the above-referred projections 45A and 47A. Based on this arrangement, the electromotive bicycle 31 transmits drive force of the crank-side disc 45 to the sprocket gear 47 via the spring 50. It is so arranged that relative position of the crank-side disc 45 and the sprocket gear 47 can be displaced via elongation and contraction of the spring 50 being variable in correspondence with pedaling force.

An end of lever 52 axially being supported by the crank-side disc 45 is pressed against the projection 47A on the part of the sprocket gear 47 to cause the displacement of relative position of the crank-side disc 45 and the sprocket gear 47 to be spread. Simultaneously, the other end of the lever 52 is also displaced. The other end of the lever 52 is connected to a sensor unit 53 set to the crank-side disc 45. Simultaneously, the torque detecting unit 33 detects displacement of the other end of the lever 52 via a signal processing circuit (not shown) set to the crank-side disc 45 and the sensor unit 53. Further, coupling elements 54A and 54B are individually disposed on the part of frame 43 at the base portion of the crank-side disc 45 and on the crank-side disc 45 itself. The torque detecting unit 33 transmits the result detected by the sensor unit 53 to the frame 43 via the above-referred coupling elements 54A and 54B before eventually detecting actual torque by processing the detected result via a signal processor 55 disposed on the frame 43.

Figure 5A:
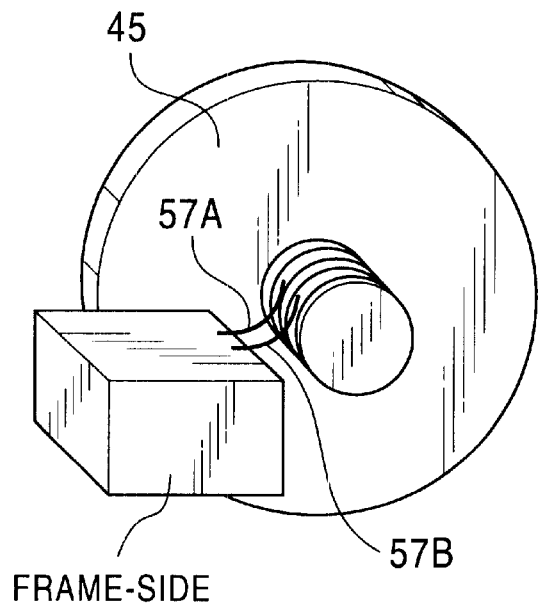
FIGS. 5A and 5B are a perspective view and a lateral view of a power-supply system provided for the electromotive bicycle shown in FIG. 2.
Figure 5B:
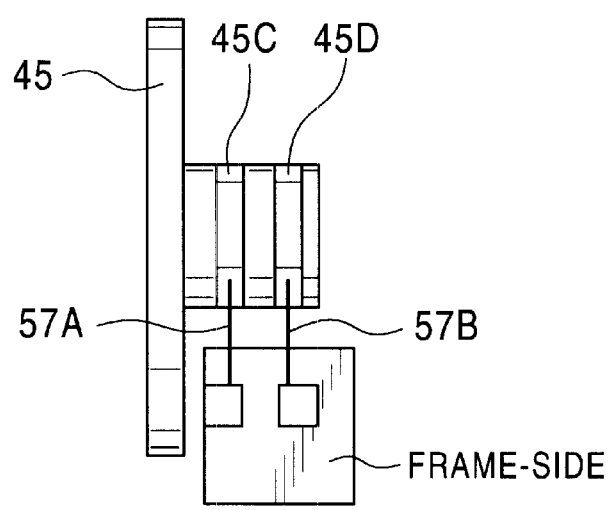

FIGS. 5A and 5B jointly represent a perspective view and a lateral view of power-supply system provided for a signal processing circuit disposed on the crankside disc 45. Pair of slip rings 45C and 45D are disposed at the base portion of the crank-side disc 45. Likewise, pair of sliding elements 57A and 57B are disposed on the part of the frame 43 so as to come into contact with the slip-rings 45C and 45D. The slip-rings 57C and 57D are respectively connected to the signal processing circuit disposed on the crank-side disc 45, whereas the slip-rings 57A and 57B are respectively connected to the battery pack B via power switch. This enables the electromotive bicycle 31 to feed power to the signal processing circuit on the movable crank-side disc 45.

Figure 1:
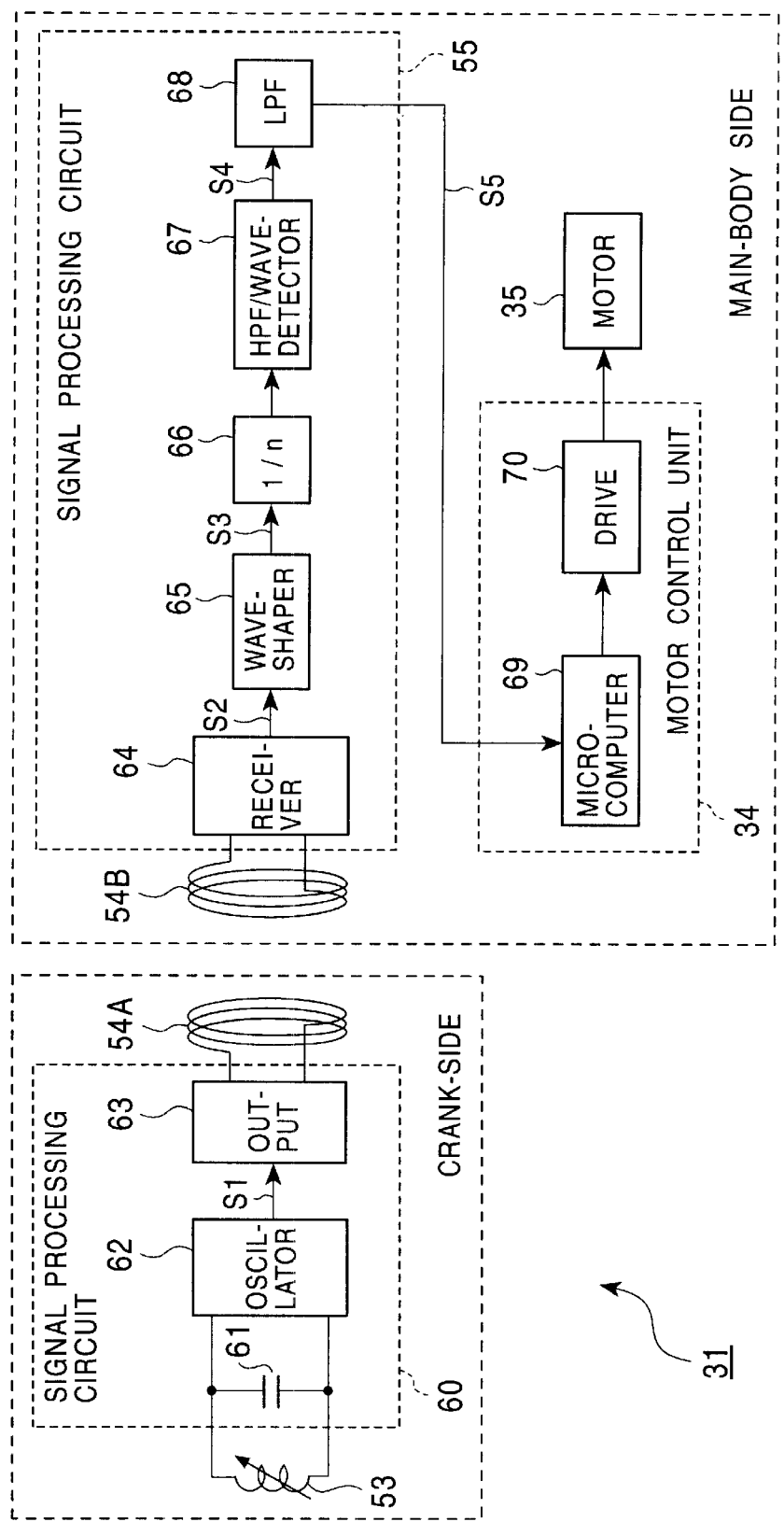
FIG. 1 is a block diagram of a novel electromotive bicycle according to a first embodiment of the present invention.

FIG. 1 is a block diagram representing structure ranging from the sensor unit 53 to the motor 35 provided for the electromotive bicycle 31. Actually, the sensor unit 53 comprises a coil whose inductance is variable by the displacement of the other end of the lever 52. In conjunction with a resonant capacitor 61 held by the signal processing circuit 60, the sensor unit 53 makes up a resonant circuit.

Figure 6:
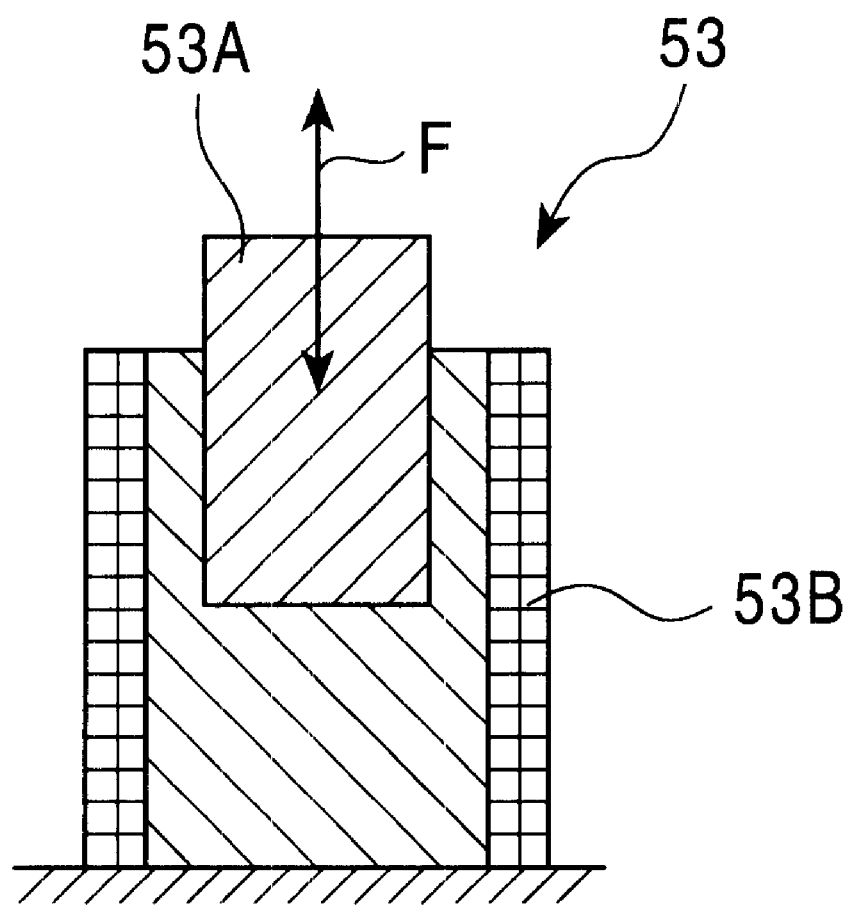
FIG. 6 is a cross-sectional view of a sensor unit 53 provided for the electromotive bicycle shown in FIG. 2.

More precisely, as shown in FIG. 6 via arrow F, as a result of the displacement of the other end of the lever 52, a movable piece 53A, which is composed of non-magnetic material such as aluminium or copper for example, of the sensor unit 53 is drawn out of an air-core coil 53B. When the movable piece 53B has been drawn out of the air-core coil 53A subsequent to the increase of pedaling force, it causes inductance to be increased by the amount corresponding to the increased pedaling force, thus further causing resonant frequency in a resonant circuit comprising resonant capacitor 61 to be decreased.

Based on resonant frequency generated by the resonant circuit, an oscillation circuit 61 shown in FIG. 1 oscillates and outputs sine-wave signal. As a result, as shown in FIGS. 7(A1) and (A2), the oscillation circuit 61 outputs sine-wave signal S1 so that oscillated frequency can be varied in correspondence with actual pedaling force. In this embodiment, the movable piece 53A is composed of aluminium. It is so arranged that the sine-wave signal S1 can be output by applying frequency-modulated signal comprising 10 MHz of carrier frequency and approximately 200 KHz of deflected frequency. It is also possible to introduce a variety of forms of LC oscillation circuits such as Hartley type, or Colpitts type, or phase-inverted type, or the like, for example.

After amplifying output signal S1 of the oscillation circuit 61, output circuit 63 outputs the amplified signal S1 to a coupling element 54A which is made of an air-core coil formed by wiring-pattern of a printed wiring board. The coupling element 54A is held in opposition from the other coupling element 54B comprising structure exactly being identical to each other. The coupling element 54A transmits an output signal of the output circuit 63 to the other coupling element 54B.

Based on the above structure, in the electromotive bicycle 31, it is so arranged that the torque detecting unit detects actual pedaling force via variation of oscillated frequency from resonant circuit and then transmits the result of detection from the movable crank-side disc 45 to the stationary main unit without coming into contact with each other. In this embodiment, each of the coils 53B respectively making up the coupling elements 54A and 54B has about 7 cm of diameter and 5 turns.

As shown in FIGS. 7B1 and 7B2, receiver circuit 64 amplifies output signal of the coupling element 54B and then outputs amplified signal. On the other hand, wave-shaping circuit 65 converts the output signal S2 of the receiver circuit 64 into binary code and then outputs a binary-coded signal S3.

A dividing circuit (1/n) 66 divides the binary-coded signal S3 into a predetermined dividing ratio and then outputs a divided signal. On the other hand, as shown in FIGS. 7C1 and 7C2, a high-pass filter (HPF)/wave-detecting circuit 67 outputs a positive component of positive/negative signal generated from a band-limited output signal. Note that FIGS. 7C1 and 7C2 represent such a case in which dividing ratio stands at 2.

Figure 7D:
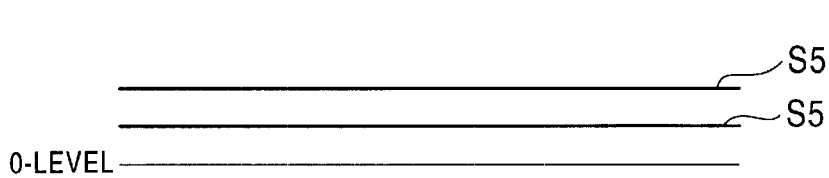

As shown in FIG. 7D, a low-pass filter LPF 68 filters out a pulse component by way of limiting frequency-band of an output signal S4 out from the high-pass filter/wave-detecting circuit 67. As a result, oscillated frequency in the oscillation circuit 62 varies in correspondence with pedaling force to cause a torque detecting signal S5 to be output, where the signal S5 contains a DC-level being varied in correspondence with varied frequency.

Accordingly, in this embodiment, the torque-detect signal S5 is processed by a micro-computer 69 of the motor controller 34 and then the motor controller 34 drives the motor 35 in accordance with the processed result via a drive unit 70. In this case, the motor 35 is driven in compliance with the operating characteristic as was described earlier by referring to FIG. 3.

Next, by referring to FIG. 2, an operation of the electromotive bicycle related to the first embodiment will be described below.

When the power switch disposed close to the display 37 is turned ON, the motor controller 34 starts operation to feed power to the torque detection unit 33, and then, in accordance with the detected result of actual pedaling force identified by the torque detecting unit 33, the motor 35 is driven. As a result, front wheel of the above electromotive bicycle 31 is driven in order that user's pedaling force can properly be assisted by drive force of the motor 35.

Referring more particularly to FIG. 4, pedaling force is transmitted to the crank-side disc 45 via the crank 44, and then, the crank-side disc 45 is conveyed to the sprocket gear 47 via the spring 50 being an elastic member to cause the chain 49 to be driven by the sprocket gear 47 to drive the rear wheel. Because of this mechanism, in the electromotive bicycle 31, whenever user's pedaling force has been strengthened in resistance against heavier pedaling effect, in other words, whenever the pedals are driven with greater torque, the spring 50 is substantially deformed to cause relative position between the crank-side disc 45 and the sprocket gear 47 to vary. In the electromotive bicycle 31, relative variation of relative position between them is expanded by the lever 52 before eventually transmitting the actual result of variation to the sensor unit 53.

Referring to FIGS. 5A and 5B, in the electromotive bicycle 31, power is fed to a signal processing circuit disposed on the crank-side disc 45 from the frame unit via a pair of slip-rings 45C and 45D disposed at the base portion of the crank-side disc 45 and a pair of sliding elements 57A and 57B respectively being in contact with the slip-rings 45C and 45D, whereby enabling the signal processing circuit to properly generate the sine-wave signal S1 corresponding to the displaced amount delivered to the sensor unit 53.

Referring to FIG. 6, in the electromotive bicycle 31, the movable piece 53A made from aluminium inserted into the air-core coil 53B of the sensor unit 53 is drawn out by the lever 52 to cause pedaling force to be strengthened. This in turn causes inductance of the air-core coil 53B to be increased by the amount corresponding to the strengthened pedaling force, whereby further causing resonant frequency generated by the air-core coil 53B and the resonant capacitor 61 to be lowered. When the oscillation circuit 62 utilizing the resonant circuit built in the signal processing circuit disposed on the crank-side disc 45 generates sine-wave signal S1, it causes torque to be increased relative to the rise of pedaling force to inversely lower frequency of the sine-wave signal S1 by the amount corresponding to the increased torque.

In the electromotive bicycle 31, after being amplified by the output circuit 63, the sine-wave signal S1 is transmitted to the frame unit via the coupling elements 54A and 54B under the non-contact condition. An output signal out from the coupling element 54B is then divided by the dividing circuit 66 and then subject to band-restriction by the high-pass filter 67 before being subject to wave detection. Next, the result of wave detection is integrated by the low-pass filter 68 whereby enabling to detect torque-detect signal S5 containing such a DC level being varied in correspondence with actual pedaling force.

Figure 31A:
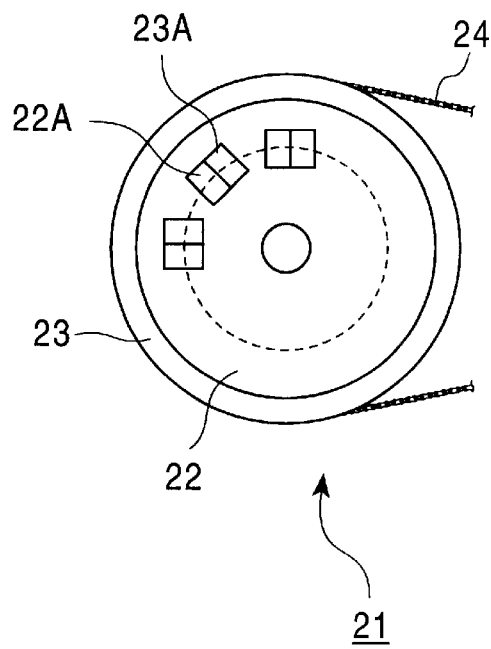
FIG. 31 is a lateral view of the torque-detecting system using optical means.
Figure 31B:
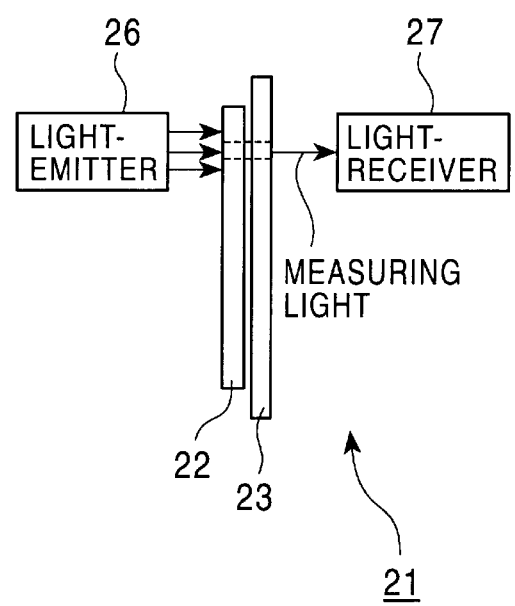
Figure 32:
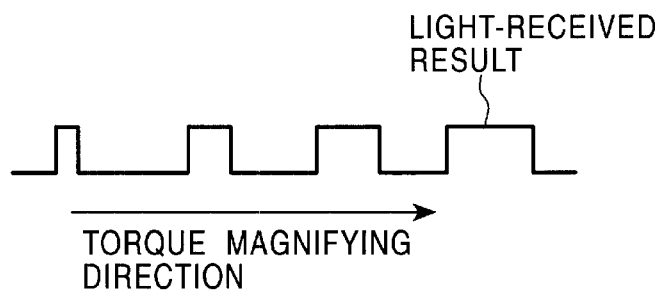
FIG. 32 is a characteristic-curve chart for explanatory of the torque-detecting system shown in FIG. 31.

Accordingly, in the electromotive bicycle 31, it is so arranged that relative position of a pair of rotary bodies coupled with a spring can be varied by actual pedaling force. Compared to the case in which torque is detected by such a system utilizing a planetary gear as was described earlier by referring to FIG. 29 for example, overall structure can securely be simplified, and yet, generation of noise can be minimized. Further, because of coupling effect via electromagnetic force generated via utilization of the coupling elements 54A and 54B, resonant frequency of the resonant circuit being variable by actual pedaling force can be detected, whereby enabling to detect actual torque as of the non-contact condition to make it possible to correctly detect actual torque with a simple structure and high precision. Further, in place of such a discrete detection method as was previously described by referring to FIG. 31, by way of detecting torque under non-contact condition, it is possible to detect variation of torque via continuously variable signal level, thus enabling the system to correctly detect actual torque with simplified structure and high precision.

By virtue of the above structural arrangement, when operating the novel electromotive bicycle, it is possible to properly assist user's pedaling force with high precision, whereby properly assisting user's pedaling operation based on distinctive operating characteristic.

According to the above-described structure, it is so arranged that relative position of a pair of rotary bodies coupled with a spring can be displaced by actual pedaling force to cause inductance to be varied by effect of the displacement. In addition, variation of resonant frequency caused by varied inductance can also be detected under non-contact condition via electromagnetic coupling generated via utilization of a pair of coupling elements 54A and 54B, whereby making it possible to properly detect actual torque with simplified structure and high precision.

More particularly, movable side comprises the sensor unit 53 comprising a coil and the signal processing circuit, etc., whereas stationary side is composed of such a structure for processing transmitted signal, whereby enabling to detect actual torque based on simplified structure with compact size and light-weight. Further, it is also possible to prevent occurrence of loss incidental to utilization of a planetary gear. Further, owing to the provision of the sensor unit, higher degree of detecting precision can be secured, and yet, by virtue of torque detection under non-contact condition, reliability can be promoted.

The Second Embodiment

Figure 8:
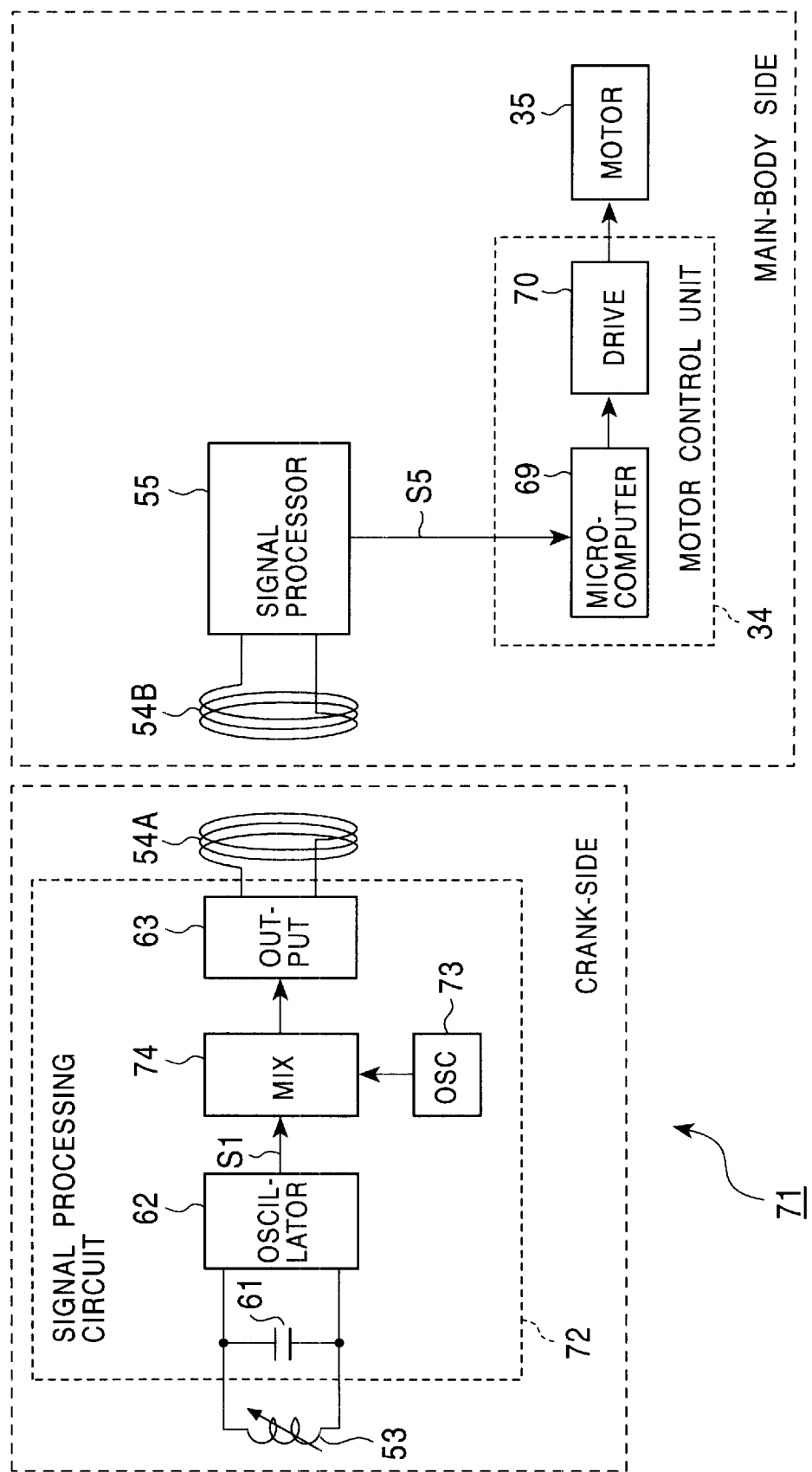
FIG. 8 is a block diagram of the electromotive bicycle according to a second embodiment of the present invention shown in comparison to FIG. 1.

Referring now to FIG. 8 designating a block diagram of the electromotive bicycle according to the second embodiment of the present invention, practical form of the second embodiment will be described below.

Except for the difference in the structure of a signal processing circuit 72 disposed on the crank-side disc 45, a novel electromotive bicycle 71 according to the second embodiment of the present invention comprises such a structure identical to that of the electromotive bicycle 31 according to the first embodiment, and thus, the following description solely refers to the different structure, whereby omitting duplicated description thereof.

An oscillation circuit (OSC) 73 built in the signal processing circuit 72 generates locally oscillating signal based on a predetermined frequency. Next, in accordance with the locally oscillating signal, mixing circuit (MIX) 74 converts frequency of output signal out from the oscillation circuit 61 into higher frequency band. The signal processing circuit 72 outputs the frequency-converted result via the output circuit 63.

According to the structure shown in FIG. 8, even when transmitting variation of resonant frequency after conversion of frequency, it is possible to secure the same effect as was generated by the first embodiment.

The Third Embodiment

Next, referring to FIG. 9 designating a block diagram of the electromotive bicycle according to the third embodiment of the present invention, a practical form of the third embodiment will be described below.

Figure 9:
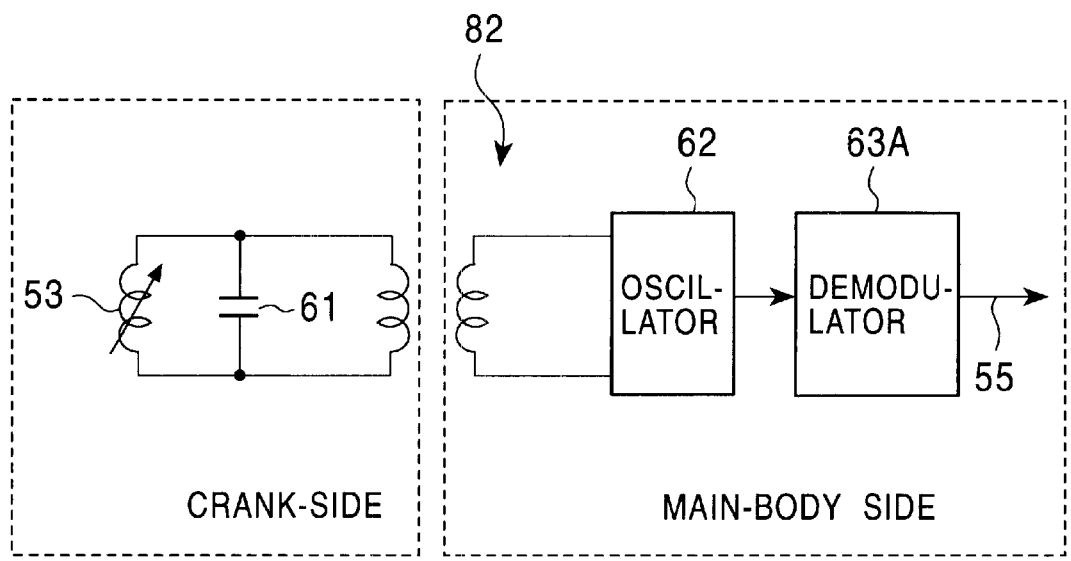
FIG. 9 is a block diagram of the electromotive bicycle according to a third embodiment of the present invention shown in comparison to FIG. 8.

The electromotive bicycle 81 shown in FIG. 9 enables an oscillation circuit 62 disposed on the part of the main body (frame-side) to detect variation of resonant frequency generated by the sensor unit 53 and the resonant capacitor 61.

More particularly, in the practical form of the third embodiment, a rotary transformer 82 is used for making up the coupling element. A resonant circuit comprising the sensor unit 53 and the resonant capacitor 61 is connected to a primary coil of the rotary transformer 82. The oscillation circuit 62 is connected to a secondary coil of the rotary transformer 82, whereby enabling the oscillation circuit 62 to output sine-wave signal S1 based on resonant frequency of the resonant circuit connected via the rotary transformer 82.

Figure 10:
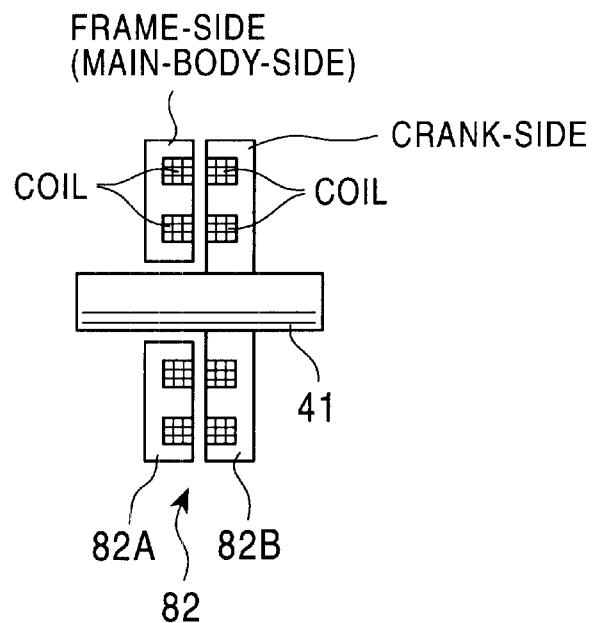
FIG. 10 is a cross-sectional view of a rotary transformer provided for the electromotive bicycle shown in FIG. 9.

As shown in FIG. 10, the rotary transformer 82 comprises a pair of disc-form magnetic material 82A and 82B which are respectively wound on concentric circular winding slits and disposed in opposition from each other on the frame side and the crank side.

A demodulation circuit 63A comprises the wave-shaping circuit 65, dividing circuit 66, high-pass filter 67, and the low-pass filter 68 described earlier by way of referring to FIG. 1. The demodulation circuit 63A processes signal output from the oscillation circuit 62 and then outputs a torque detecting signal S5 whose signal level is variable in correspondence with variation of resonant frequency.

According to the structures shown in FIG. 9 and FIG. 10, even when the system detects variation of resonant frequency by disposing the oscillation circuit on the part of the main body, the same effect as was generated by the form of the first embodiment can be secured.

The Fourth Embodiment

Figure 11:
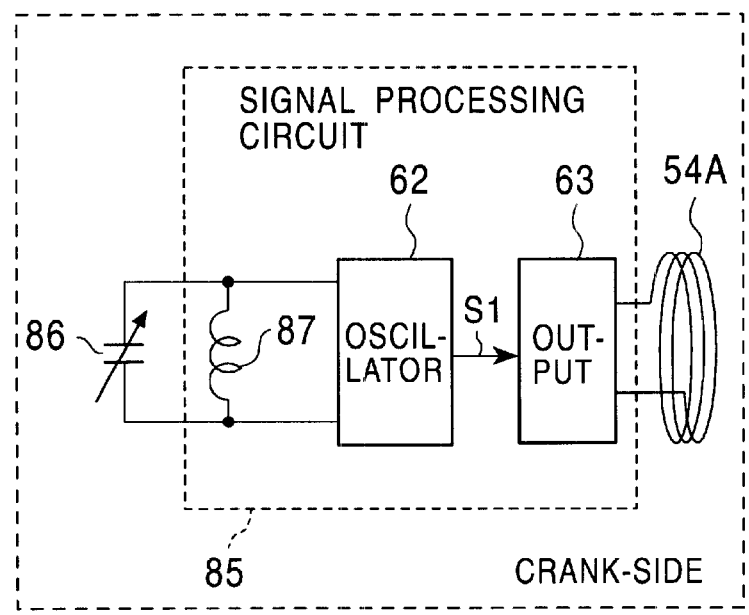
FIG. 11 is a block diagram of the electromotive bicycle according to a fourth embodiment of the present invention shown in comparison to FIG. 9.

Referring now to FIG. 11 designating a block diagram of the signal processing circuit in conjunction with peripheral structural components of the electromotive bicycle according to the fourth embodiment of the present invention, a practical form of the fourth embodiment will be described below. In place of the above-referred signal processing circuit 60 and the sensor unit 53 described earlier by referring to FIG. 1, a signal processing circuit 85 and a sensor unit 86 are respectively applied for the electromotive bicycle the fourth embodiment.

Figure 12:
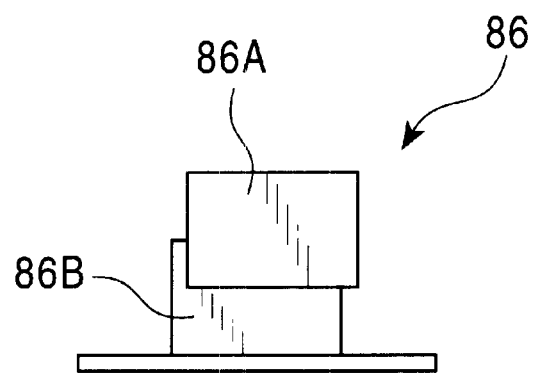
FIG. 12 is a simplified drawing representing the sensor unit of the electromotive bicycle shown in FIG. 11.

The sensor unit 86 comprises a capacity-variable capacitor which varies own capacity via the displacement of the other end of the lever 52. Concretely, as shown in FIG. 12, the sensor unit 85 is so structured by way of inserting a certain number of movable electrodes 86B disposed in parallel with each other between a plurality of stationary electrodes 86A respectively being disposed in parallel with each other. It is so arranged that the inserted amount can be varied by the amount of the displacement of the other end of the lever 52.

In the signal processing circuit 85, a resonant circuit is formed by connecting the sensor unit 86 comprising capacity-variable capacitors to a resonant coil 87 in parallel to enable the oscillation circuit 62 to generate s sine-wave signal S1 via resonant frequency of the resonant circuit. Based on this structure, in the practical form of the fourth embodiment, resonant frequency of the resonant circuit is varied by causing capacity to be variable by actual pedaling force, and then, by way of detecting the resonant frequency, actual pedaling force can be detected.

According to the structure shown in FIG. 11 and FIG. 12, even when detecting actual pedaling force via detection of resonant frequency after varying inductance, it is possible to achieve the same effect as was secured by implementing the form of the first embodiment.

The Fifth Embodiment

Next, referring to FIG. 13 designating a block diagram of another signal processing circuit in conjunction with peripheral structural components of the electromotive bicycle according to the fifth embodiment of the present invention, a practical form of the fifth embodiment of the present invention will be described below.

In place of the above-referred signal processing circuit 60 and the sensor unit 53 described earlier by referring to FIG. 1, the electromotive bicycle according to the fifth embodiment introduces another signal processing circuit 90 and another sensor unit 91.

Figure 14:
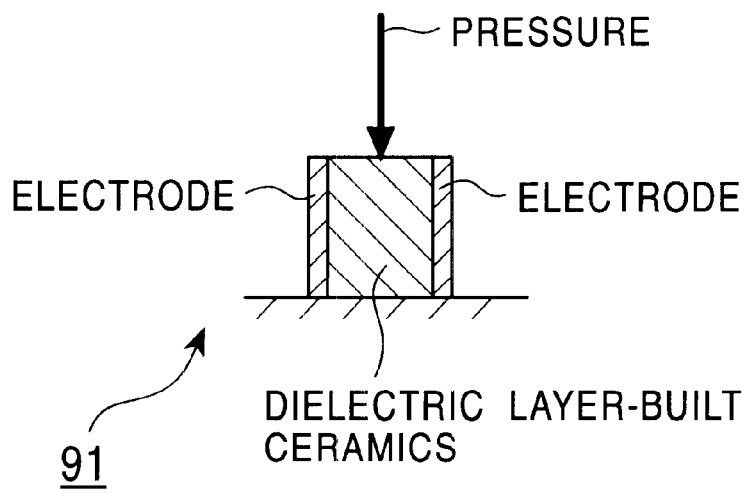
FIG. 14 is a cross-sectional view of a sensor unit provided for the electromotive bicycle shown in FIG. 13.

The sensor unit 91 comprises a ceramics oscillator. As shown in FIG. 14, the sensor unit 91 is manufactured by fabricating electrodes via vapor-deposition against two opposite surfaces of dielectric layer-built ceramics made from a predetermined material. The sensor unit 91 presses the dielectric crystal via the other end of the lever 52 via elastic material such as spring to cause resonant frequency to be varied in correspondence with actual pedaling force.

An oscillation circuit 92 built in the signal processing circuit 90 generates oscillation by effect of ceramics oscillator substantially being the sensor unit 91 and then outputs a sine-wave signal S1 via resonant frequency of the ceramics oscillator.

Figure 13:
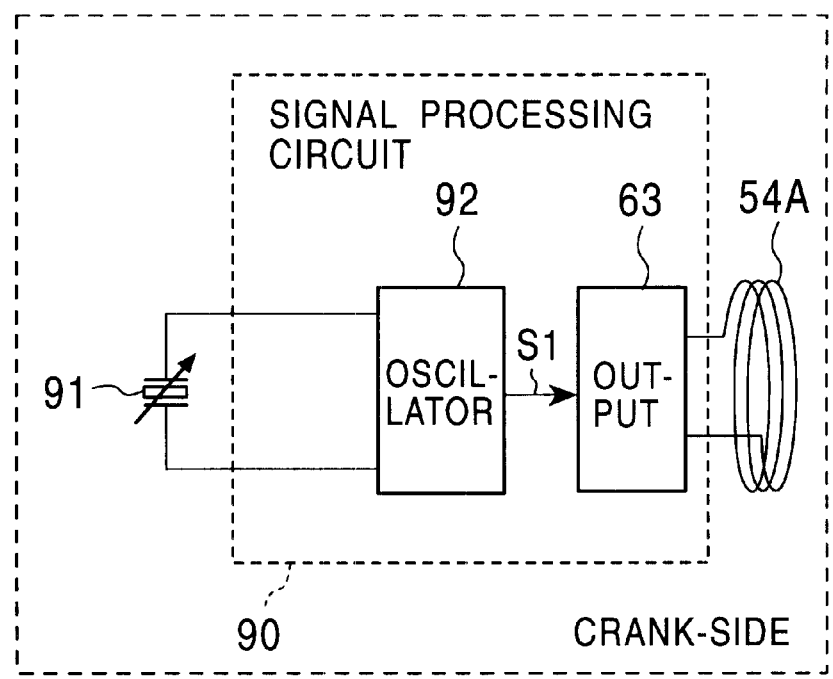
FIG. 13 is a block diagram of the electromotive bicycle according to a fifth embodiment of the present invention shown in comparison to FIG. 9.

As shown in FIG. 13 and FIG. 14, even when detecting variation of resonant frequency variable by the pressed oscillator, it is possible to achieve the same effect as was secured by implementing the first embodiment.

Next, other forms of embodiments will be described below. The above description has solely referred to the practical forms of the preceding embodiments in the case in which inductance is varied by varying inserted amount of non-magnetic movable piece 53A against the air-core coil 53B. However, the scope of the present invention is not solely defined within the above forms, but, even when composing the movable piece 53A with magnetic material such as ferrite, it is possible to achieve the same effect as was secured by implementing the above embodiments. It should be understood however that, when composing the movable piece 53A with magnetic material, variation of inductance against the inserted amount is inverse from the case of utilizing non-magnetic material.

Figure 15:
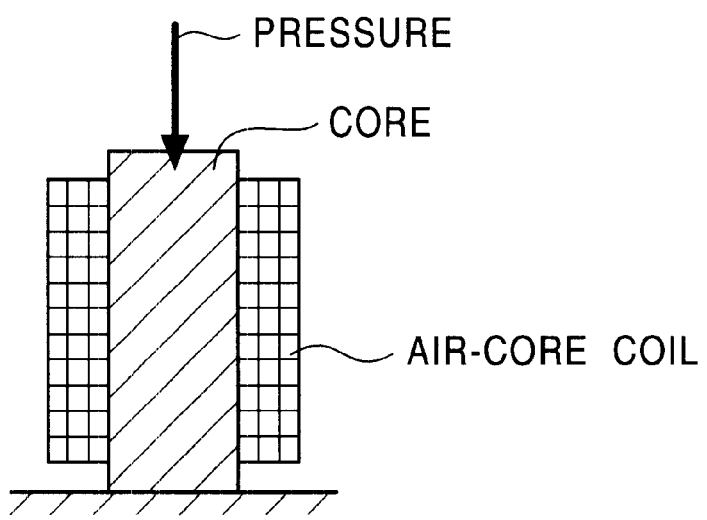
FIG. 15 is a cross-sectional view of a sensor unit capable of varying resonant frequency via variation of inductance according to another embodiment of the present invention.

The above description has referred to one of the preceding embodiments in which inductance has been varied by varying inserted amount of the movable piece 53A against the air-core coil 53B. However, the scope of the present invention is not solely limited to this method, but, as shown in FIG. 15, it is also possible to dispose such a core comprising magneto-striction material inside of an air-core coil 93B to enable the other end of the lever 52 to press the core via an elastic member such as a spring. Even when introducing this method, it is possible to vary inductance and achieve the same effect as was secured by implementing the above embodiments.

Figure 16:
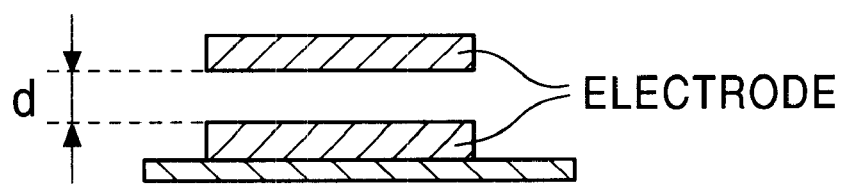
FIG. 16 is a cross-sectional view of a sensor unit capable of varying resonant frequency via variation of capacity according to another embodiment of the present invention.
Figure 17:
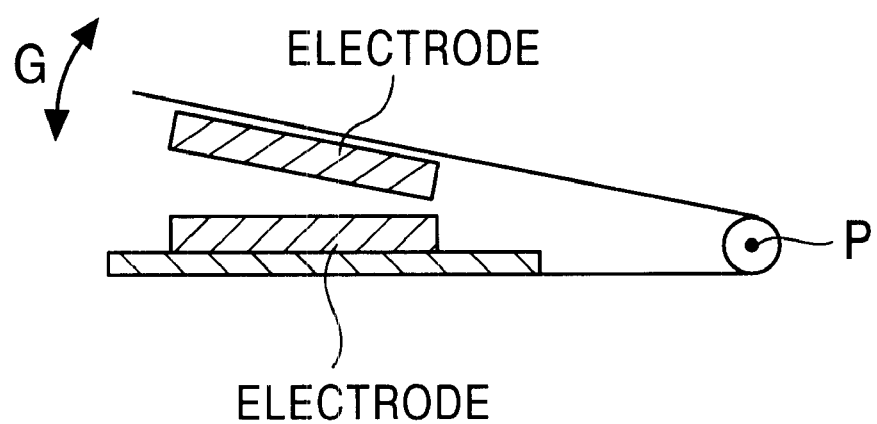
FIG. 17 is a cross-sectional view of a sensor unit based on a structure being different from the embodiment shown in FIG. 16.
Figure 18:
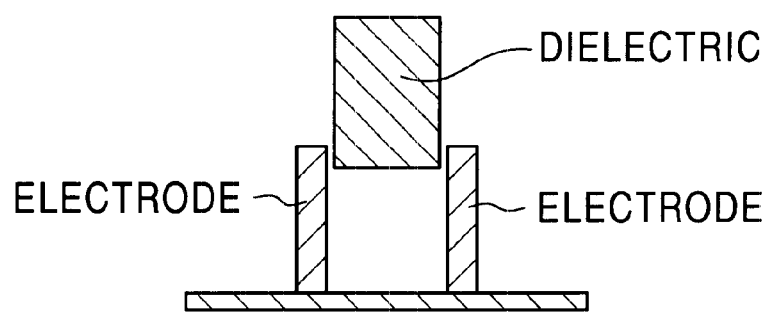
FIG. 18 is a cross-sectional view of a sensor unit capable of varying capacity in correspondence with inserting amount of dielectric.

The above description has also described in detail regarding one of the preceding embodiments in which capacity has been varied by varying inserted amount of the movable electrodes 86B against stationary electrodes 86A being disposed in parallel. However, the scope of the present invention is not solely limited to this method, but, as shown in FIG. 16 and also in FIG. 17 via arrow G, when varying intervals "d" between plane electrodes disposed in parallel, such a method is conceived, which varies intervals between the electrodes by rotating them on the either side in the periphery of the reference fulcrum P. Further, as shown in FIG. 18, it is also conceivably practicable to vary capacity by varying inserted amount of dielectrics being disposed between plane electrodes set in parallel with each other.

Figure 19:
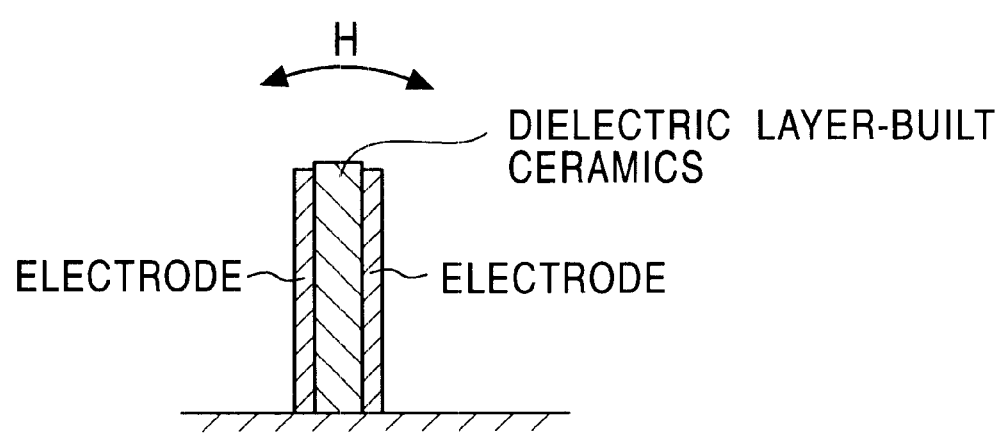
FIG. 19 is a cross-sectional view of a sensor unit capable of varying capacity in correspondence with pressing force being applied.

The above description has also described in detail regarding one of the preceding embodiments in which resonant frequency has been varied by varying pressing force of oscillator. However, the scope of the present invention is not solely limited to this method, but, as shown in FIG. 19 via arrow H, it is also conceivably practicable to vary resonant frequency by way of bending dielectric layer-built ceramics.

The above description has also described in detail regarding one of the preceding embodiments in which resonant frequency has been varied by variation of inductance and capacity. However, the scope of the present invention is not solely limited to this method, but it is also conceivably practicable to vary resonant frequency by way of combining them with each other.

Figure 20:
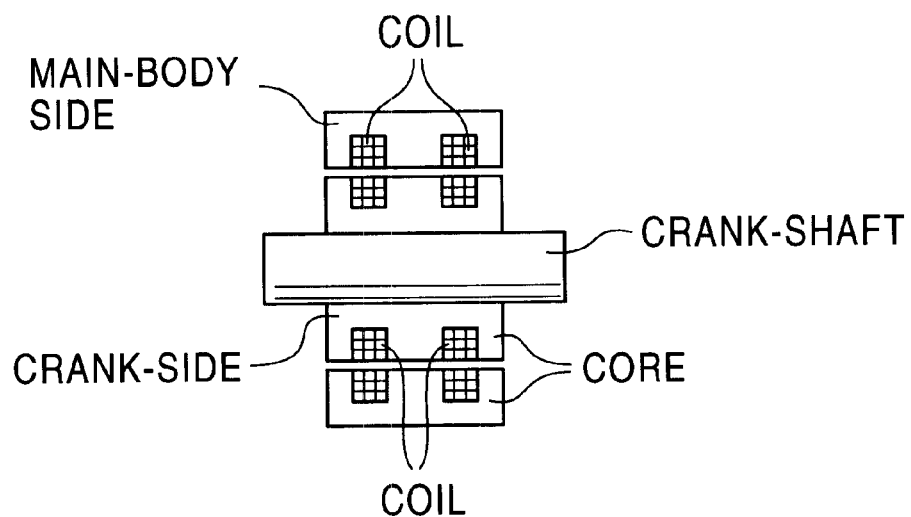
FIG. 20 is a cross-sectional view of as rotary transformer according to another embodiment of the present invention.

The above description has also described in detail regarding one of the preceding embodiments in which variation of resonant frequency has been transmitted via a pair of rotary transformers comprising disc-form magnetic materials 82A and 82B being opposite from each other. However, the scope of the present invention is not solely limited to this method, but as shown in FIG. 20 in a cross-sectional view, it is also conceivably practicable to use such rotary transformers comprising cylindrical cores.

Figure 21:
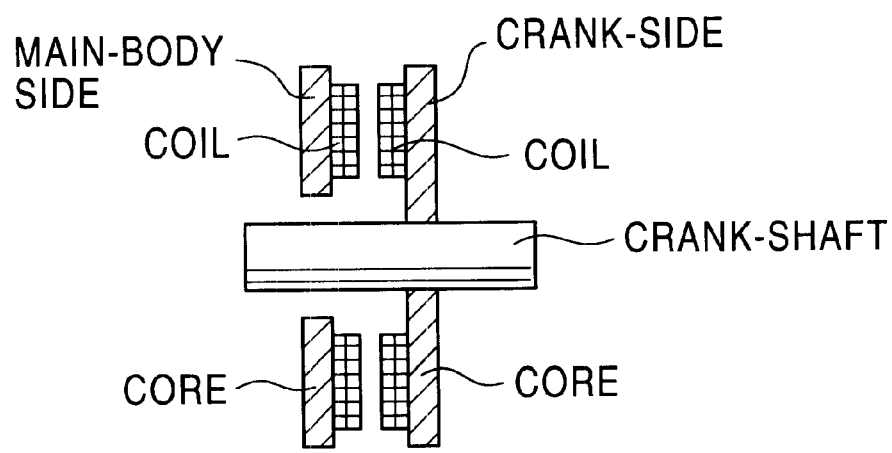
FIG. 21 is a cross-sectional view of coupling elements each comprising an air-core coil incorporating such a core according to another embodiment of the present invention.
Figure 22:
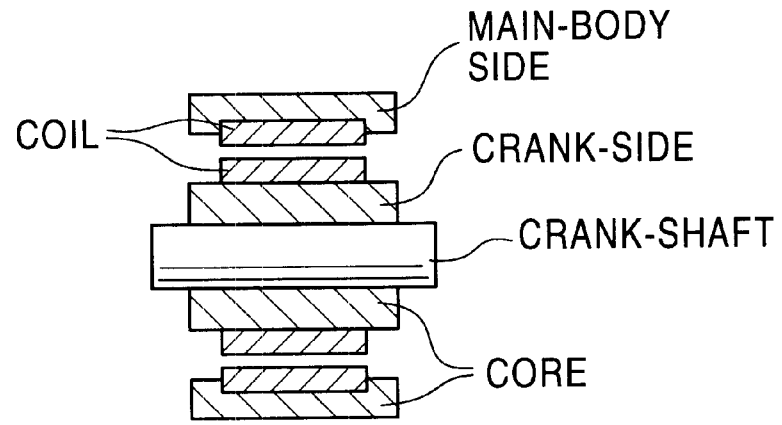
FIG. 22 is a cross-sectional view of coupling elements comprising such a structure being different from the embodiment shown in FIG. 21.

The above description has also described in detail regarding one of the preceding embodiments in which variation of resonant frequency has been transmitted via air-core coils and rotary transformers. However, the scope of the present invention is not solely limited to this method, but it is also conceivably practicable to dispose magnetic circuit inside of the air-core coil. In this case, as is shown in a cross-sectional view shown in FIG. 21, it is also conceivably practicable to dispose a pair of disc-form cores in opposition from each other and dispose wound-wires on the opposite surfaces. Further, as shown in FIG. 22 via the cross-sectional view, it is also conceivably practicable to form wound-wires on the inner and outer circumferential surfaces of a pair of cylindrical cores.

Figure 23:
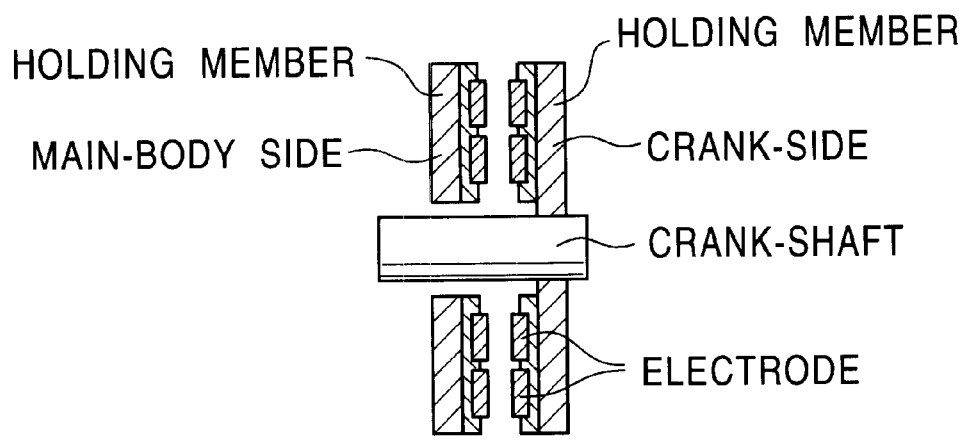
FIG. 23 is a cross-sectional view of coupling elements respectively utilizing static capacity.
Figure 24:
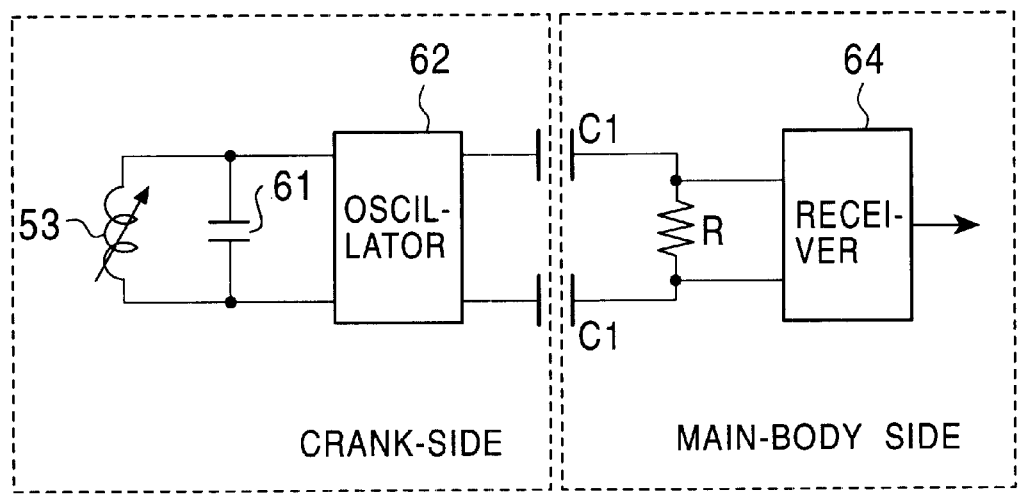
FIG. 24 is a block diagram of signal transmission system formed by coupling elements shown in FIG. 23.
Figure 25:
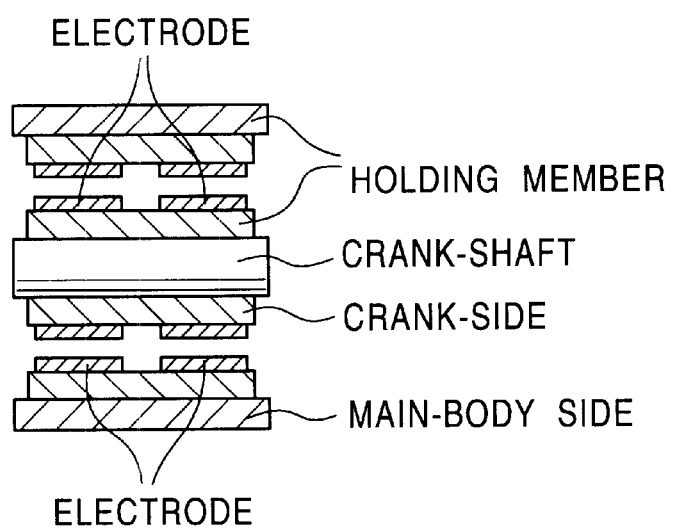
FIG. 25 is a cross-sectional view of coupling elements each comprising such a structure being different from the embodiment shown in FIG. 23.

The above description has also described in detail regarding one of the preceding embodiments in which variation of resonant frequency has been transmitted via magnetic coupling of wound wires. However, the scope of the present invention is not solely limited to this method, but it is also conceivably practicable to transmit variation of resonant frequency via the coupling of static capacity between electrodes. In this case, as shown in FIG. 23 in a cross-sectional view, it is also conceivably practicable to dispose disc-form holding members in opposition from each other and then dispose opposite electrodes by way of insulating them from the opposite surfaces. In this case, as shown in FIG. 24 by way of comparison to FIG. 1, a signal transmission system can be designated. Note that the reference character C designates static capacity between opposite electrodes. Further, in this case, as shown in FIG. 25 in a cross-sectional view, it is also conceivably possible to form opposite electrodes on the opposite inner and outer surface of a pair of cylindrical holding members by way of insulating the opposite electrodes from each other.

Figure 26A:
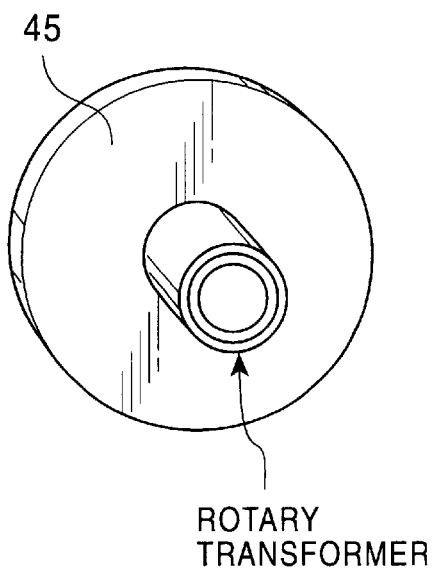
FIGS. 26A and 26B are a perspective view and a cross-sectional view of power-supply system according to another form of the embodiment.
Figure 26B:
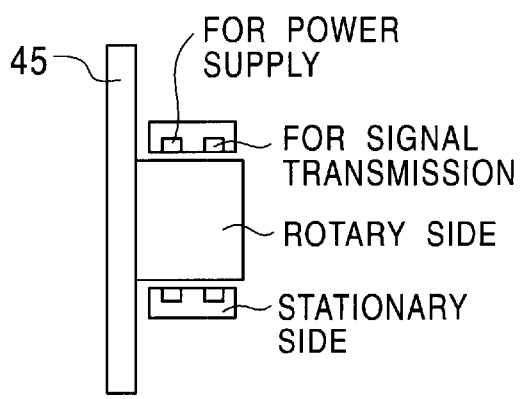
Figure 27:
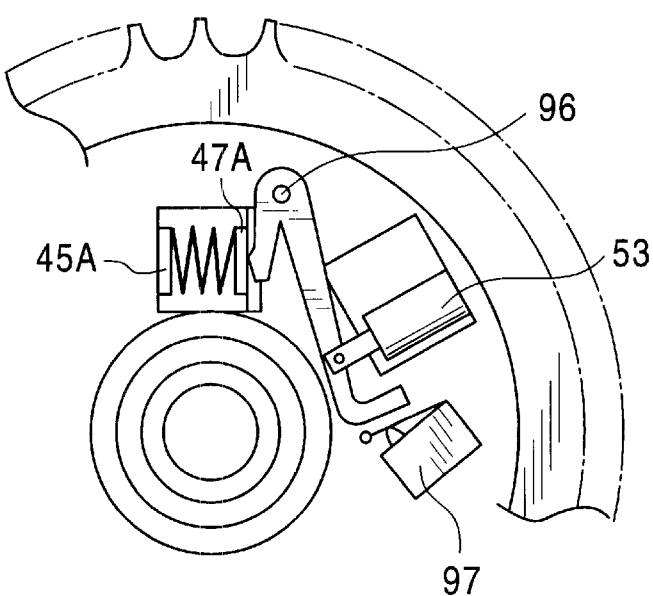
FIG. 27 is a plan view of a system for controlling power supply in correspondence with torque.
Figure 29:
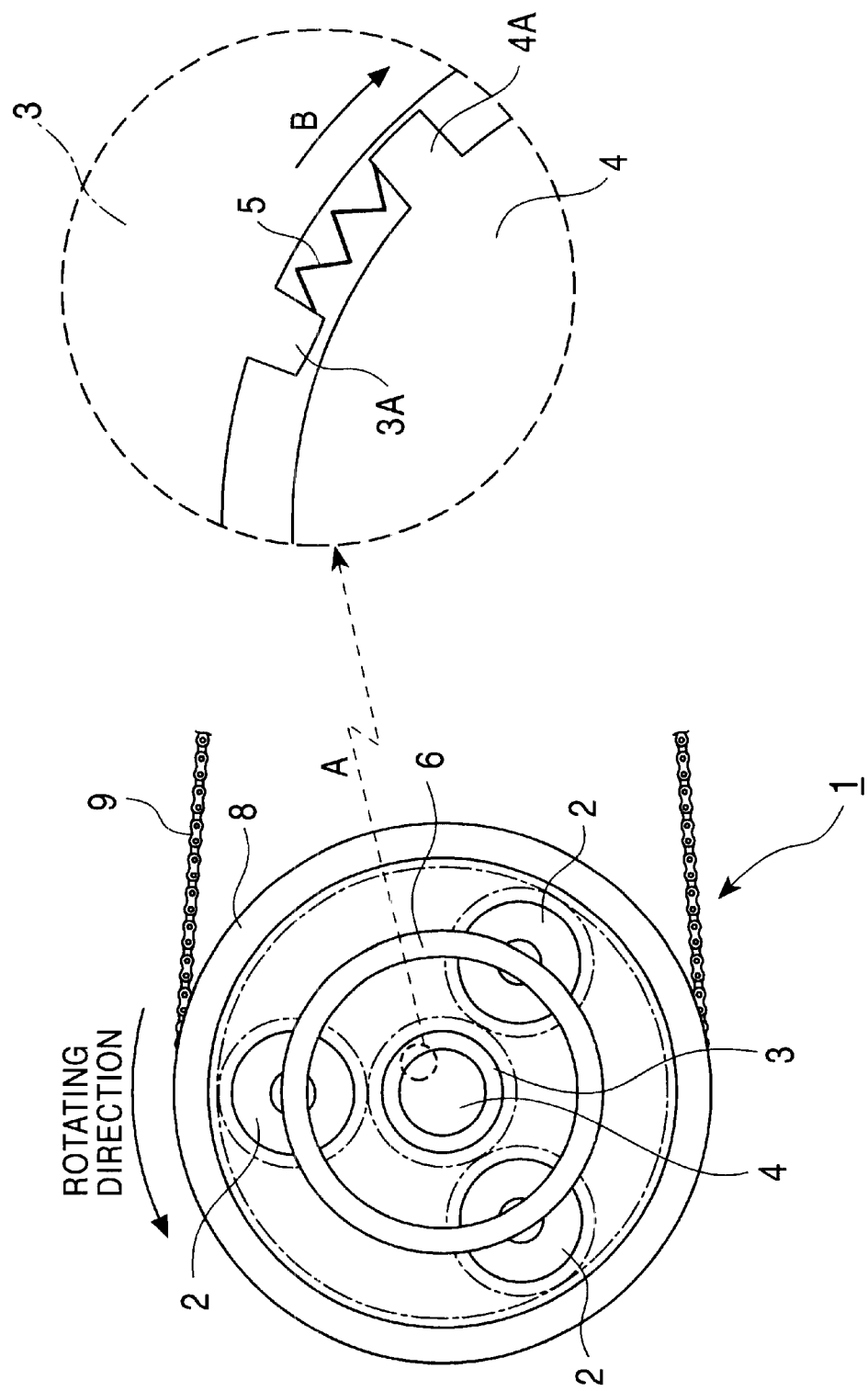
FIG. 29 is a plan view of the torque-detecting system using a planetary gear.
Figure 30:
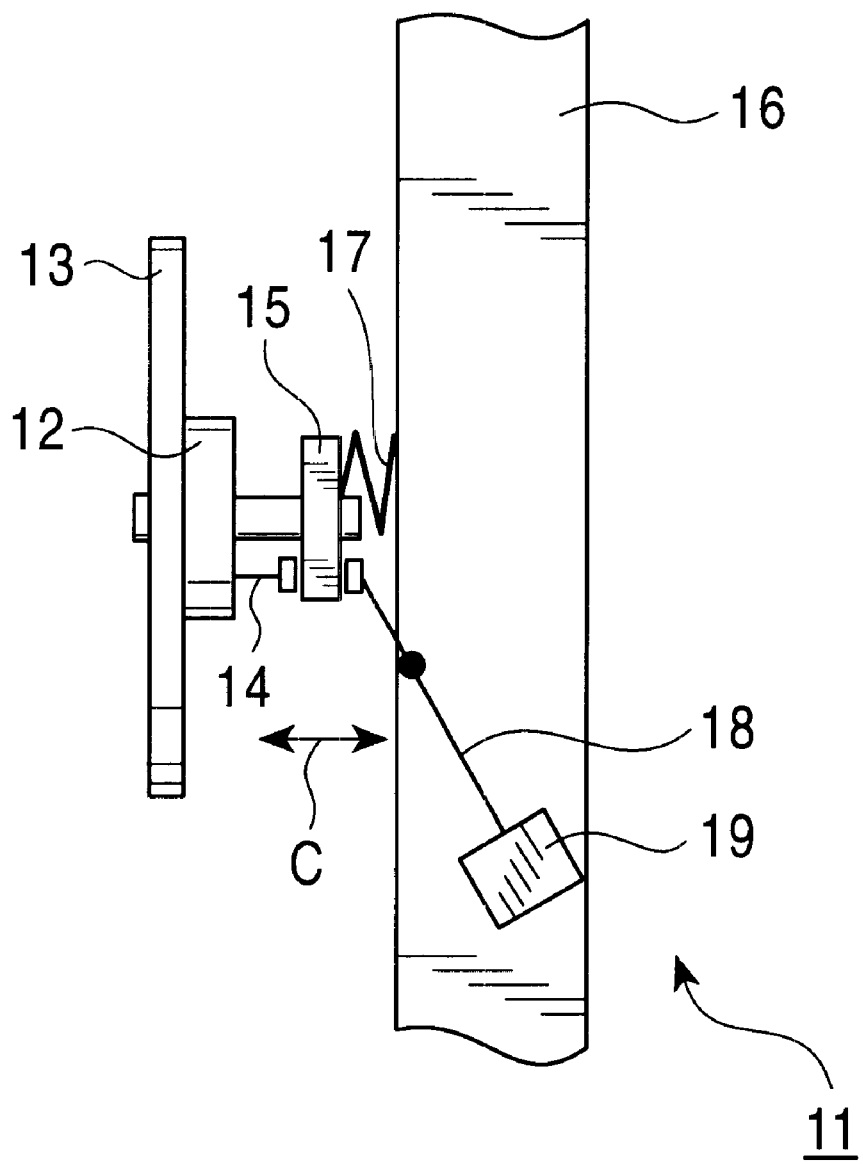
FIG. 30 is a lateral view of the torque-detecting system based on displacement of relative positions of rotary bodies.

The above description has also described in detail regarding one of the preceding embodiments in which power has been supplied to the movable side via power collecting method by way of utilizing slip rings. However, the scope of the present invention is not solely limited to this method, but a variety of methods are also applicable. In this case, as shown in FIGS. 26A and 26B in a perspective view and a cross-sectional view in comparison to FIG. 5, it is also conceivably practicable to supply power by way of utilizing the rotary transformers. When utilizing the rotary transformers, it is conceivably possible to jointly transmit variation of resonant frequency via the rotary transformers. Further, it is also conceivably possible to install a battery unit on the movable side to execute operation via the power fed from this battery. In this case, as shown in FIG. 29, for example, by way of bending tip portion of the elongated other end of the lever 96 and disposing power switch 97 on the bent tip portion, it can be so arranged that power supply is implemented solely in the case in which pedaling force has been strengthened to some extent, whereby saving power consumption.

Figure 28:
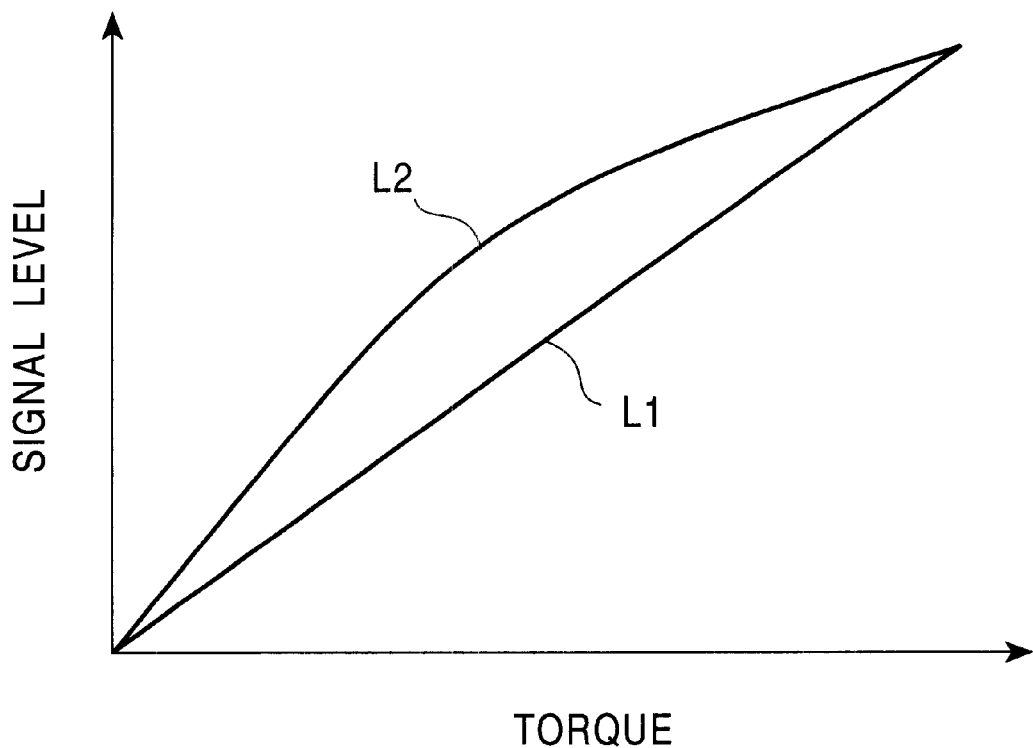
FIG. 28 is a characteristic-curve chart for explanatory of correction of torque-detecting characteristic.

The above description has also described in detail regarding one of the preceding embodiments in which torque has been detected by merely demodulating a frequency-modulated signal. However, the scope of the present invention is not solely limited to this method, but it is also conceivably practicable to arrange the relationship between torque and the signal level of torque-detect signal being the result of detection into desired characteristic by properly setting characteristic of demodulating circuit and modulating circuit at the time of effecting demodulation and frequency modulation whenever being required. In this case, as shown in FIG. 28 via the reference code L1 for example, when linearity is considered to be of critical characteristic, as shown via the other reference code L2, it is possible to set the characteristic as the one critically considering sensitiveness at the portion at which amount of torque remains insubstantial.

The above description has also described in detail regarding one of the preceding embodiments in which torque-detect signal has been generated by detecting variation of frequency of a sine-wave signal S1 via analog signal processing method. However, the scope of the present invention is not solely limited to this method, but it is also possible to generate torque-detect signal via measurement of frequency by applying counter for example, and yet, a variety of frequency-demodulating techniques may also be applied. Further, it is also conceivably possible to convert the transmitted signal into low-band frequency when detecting frequency in this way.

The above description has also described in detail regarding one of the preceding embodiments in which torque being the actual pedaling force has been detected by variation of resonant frequency. However, the scope of the present invention is not solely limited to this method, but it is also possible to detect variation of actual pedaling force via variation of voltage by providing a variable resistor for the sensor unit. When applying this method, a PLL circuit and a VCO may be used for composing the oscillating circuit.

The above description related to the first embodiment has referred to the case of transmitting the result of detection of torque via frequency modulation by way of transmitting variation of resonant frequency. However, the scope of the present invention is not solely limited to this method, but it is possible to extensively apply a variety of modulation methods such as broad phase modulation method including pulse-width modulation or the like as required.

The above description has also described in detail regarding one of the preceding embodiments in which relative position of a pair of rotary bodies has been varied in correspondence with actual torque by way of transmitting drive force via a spring. However, the scope of the present invention is not solely limited to this method, but a wide variety of elastic members may also be used in place of spring.

The above description has also referred to the preceding embodiments in which actual pedaling force has been detected as the actual toque by way of applying the present invention to an electromotive bicycle. However, the scope of the present invention is not solely limited to the case of application to the electromotive bicycle, but the present invention can extensively be applied whenever detecting torque of a variety of operating apparatuses as well.

The above description has also described in detail regarding one of the preceding embodiments in which torque has been detected via a drive mechanism rotating itself solely in one direction. However, the scope of the present invention is not solely limited to this method, but the present invention is also extensively applicable to such a case in which the direction of the rotation of the drive mechanism has been inverted.

As has thus been described, according to the present invention, based on simple structure, the toque detecting apparatus of the present invention correctly detects actual torque by way of transmitting drive force via a pair of rotary bodies that cause own relative position to be varied by torque in order to detect variation of resonant frequency corresponding to variation of the relative position under non-contact condition or by way of transmitting drive force via a pair of rotary bodies that cause own relative position to be varied by torque in order to transmit modulated signal corresponding to variation of the relative position, whereby making it possible to detect actual torque with high precision.

What is claimed is:

1. A torque detecting apparatus, comprising:
    drive-force-transmitting means which varies relative position of an output-side rotary body against a drive-source-side rotary body in correspondence with torque by way of transmitting drive force from said drive-source-side rotary body to said output-side rotary body via a predetermined elastic member;
    displacement detecting means which is held by one of said drive-source-side rotary body and said output-side rotary body and generates torque-modulated signal being modulated by torque signal in correspondence with variation of said relative position;
    signal transmitting means which transmits said torque-modulated signal to one of a stationary member fixed to said drive-source-side rotary body and a stationary member fixed to said drive-source-side rotary body and a stationary member fixed to said output-side rotary body under non-contact condition;
    signal processing means which outputs a result of torque detection in accordance with an output signal from said signal transmitting means; and
    detection result processing means for processing said torque-detected result;
    wherein:
    said drive-force transmitting means transmits drive force generated by pedaling force;
    said output-side rotary body drives one of a front wheel and a rear wheel via said drive force; and
    said detection result processing means generates drive force for assisting said pedaling force in accordance with said result of torque detection.

2. The torque detecting apparatus according to claim 1, wherein said torque-modulated signal comprises any one of a frequency-modulated signal and a phase-modulated signal.

3. The torque detecting apparatus according to claim 1, wherein said displacement detecting means comprises a frequency modulating means which generates said torque-modulated signal by varying inductance and/or capacity in accordance with variation of said relative position.

4. The torque detecting apparatus according to claim 1, wherein said displacement detecting means is a frequency modulating means which generates said torque modulated signal by varying force pressing against an oscillator in accordance with variation of said relative position.

5. The torque detecting apparatus according to claim 1, wherein said signal transmitting means transmits said torque modulated signal via magnetic coupling of wound wires.

6. The torque detecting apparatus according to claim 1, wherein said signal transmitting means transmits said torque modulated signal via coupling of static capacity between electrodes.

7. The torque detecting apparatus according to claim 1, wherein power-source of said displacement detecting means is supplied from a battery.

8. The torque detecting apparatus according to claim 7, wherein said battery is held by one of said drive-source-side rotary body and said output-side rotary body.

9. The torque detecting apparatus according to claim 1, further comprising power-supply means for supplying power source of said displacement detecting means from said stationary member.

10. The torque detecting apparatus set forth in claim 8, further comprising a switch which is provided on one of said power-source-side rotary body and said output-side rotary body in order to execute ON/OFF control of power supply to said signal processing circuit in correspondence with said relative position.

11. The torque detecting apparatus set forth in claim 9, further comprising a switch which is provided on one of said power-source-side rotary body and said output-side rotary body in order to execute ON/OFF control of power supply to said signal processing circuit in correspondence with said relative position.

12. A torque detecting apparatus, comprising:
    drive force transmitting means which varies relative position of an output-side rotary body against a drive-source-side rotary body in correspondence with torque by way of transmitting drive force from said drive-source-side rotary body to said output-side rotary body via a predetermined elastic member;
    modulating means which is held by one of said drive-source-side rotary body and said output-side rotary body and generates modulated signal in accordance with variation of said relative position;
    signal transmitting means which transmits said modulated signal to one of a stationary member fixed to said drive-source-side rotary body and a stationary member fixed to said output-side rotary body under non-contact condition;
    signal processing means which processes said modulated signal transmitted via said signal transmitting means and then outputs a result of torque detection; and
    detected result processing means which processes said torque-detected result,
    wherein:
    said drive force transmitting means transmits drive force generated by pedaling force;
    said output-side rotary body drive one of a front wheel and a rear wheel via said drive force; and
    said detection result processing means generates drive force for assisting said pedaling force in accordance with said result of torque detection.

13. The torque detecting apparatus according to claim 12, wherein said modulating means generates said modulated signal in accordance with one of frequency modulation and phase modulation.

14. The torque detecting apparatus according to claim 12, wherein said modulating means generates said modulated signal in accordance with variation of said relative position.

15. The torque detecting apparatus according to claim 12, wherein said modulating means generates said modulated signal by varying resonant frequency of said oscillator by varying force pressing against an oscillator as a result of variation of said relative position.

16. The torque detecting apparatus according to claim 12, wherein said signal transmitting means transmits said modulated signal via magnetic coupling of wound wires.

17. The torque detecting apparatus according to claim 12, wherein said signal transmitting means transmits said modulated signal via coupling of static capacity between electrodes.

18. The torque detecting apparatus according to claim 12, wherein power source of said modulating means is supplied from a battery.

19. The torque detecting apparatus according to claim 18, wherein said battery is held by one of said drive-source-side rotary body and said output-side rotary body.

20. The torque detecting apparatus according to claim 12, further comprising power-supply means which supplies power of said modulating means from said stationary member.

21. The torque detecting apparatus according to claim 19, further comprising a switch which is provided on one of said drive-source-side rotary body and said output-side rotary body in order to execute ON/OFF control of power supply to said modulating means in correspondence with variation of said relative position.

22. The torque detecting apparatus according to claim 20, further comprising a switch which is provided on one of said drive-source-side rotary body and said output-side rotary body in order to execute ON/OFF control of power supply to said modulating means in correspondence with variation of said relative position.

* * * * *